United States Patent
Castillo Canales et al.

(10) Patent No.: US 10,706,693 B1
(45) Date of Patent: Jul. 7, 2020

(54) HAPTIC DEVICE FOR CREATING VIBRATION-, PRESSURE-, AND SHEAR-BASED HAPTIC CUES

(71) Applicant: FACEBOOK TECHNOLOGIES, LLC, Menlo Park, CA (US)

(72) Inventors: Pablo Castillo Canales, Union City, CA (US); Ali Israr, Bothell, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/244,018

(22) Filed: Jan. 9, 2019

Related U.S. Application Data

(60) Provisional application No. 62/616,369, filed on Jan. 11, 2018.

(51) Int. Cl.
 *G08B 6/00* (2006.01)
 *A63F 13/285* (2014.01)

(52) U.S. Cl.
 CPC .............. *G08B 6/00* (2013.01); *A63F 13/285* (2014.09)

(58) Field of Classification Search
 CPC .......... B25J 13/02; G05G 5/03; A61B 5/7455; A61N 1/08; G06F 1/163; G06F 3/016; A63F 13/211; A63F 13/24
 See application file for complete search history.

(56) References Cited

U.S. PATENT DOCUMENTS

| | | | | |
|---|---|---|---|---|
| 2010/0300230 A1* | 12/2010 | Helmer | ................... | B25J 9/106 74/469 |
| 2013/0217998 A1* | 8/2013 | Mahfouz | ................ | G16H 50/50 600/409 |
| 2014/0139637 A1* | 5/2014 | Mistry | .................. | G06F 3/0304 348/46 |
| 2016/0058375 A1* | 3/2016 | Rothkopf | .............. | G06F 1/1643 600/301 |
| 2017/0042467 A1* | 2/2017 | Herr | ...................... | A61B 5/6828 |
| 2017/0322626 A1* | 11/2017 | Hawkes | ................ | A63F 13/211 |

* cited by examiner

*Primary Examiner* — Mirza F Alam
(74) *Attorney, Agent, or Firm* — Morgan, Lewis & Bockius LLP

(57) ABSTRACT

A haptic device is provided that includes a first haptic assembly, comprising (i) a first end effector, and (ii) a first actuator coupled with the first end effector. The first actuator is configured to move the first end effector in first direction(s). The first haptic assembly is configured to create a first haptic stimulation or a second haptic stimulation, felt by a wearer of the haptic device, when the first actuator moves the first end effector in the first direction(s). The haptic device includes a second haptic assembly, comprising: (i) a second end effector, and (ii) a second actuator coupled with the second end effector. The second actuator is configured to move the second end effector in second direction(s). The second haptic assembly is configured to create a third haptic stimulation, felt by the wearer, when the second actuator moves the second end effector in the second direction(s).

17 Claims, 22 Drawing Sheets
(4 of 22 Drawing Sheet(s) Filed in Color)

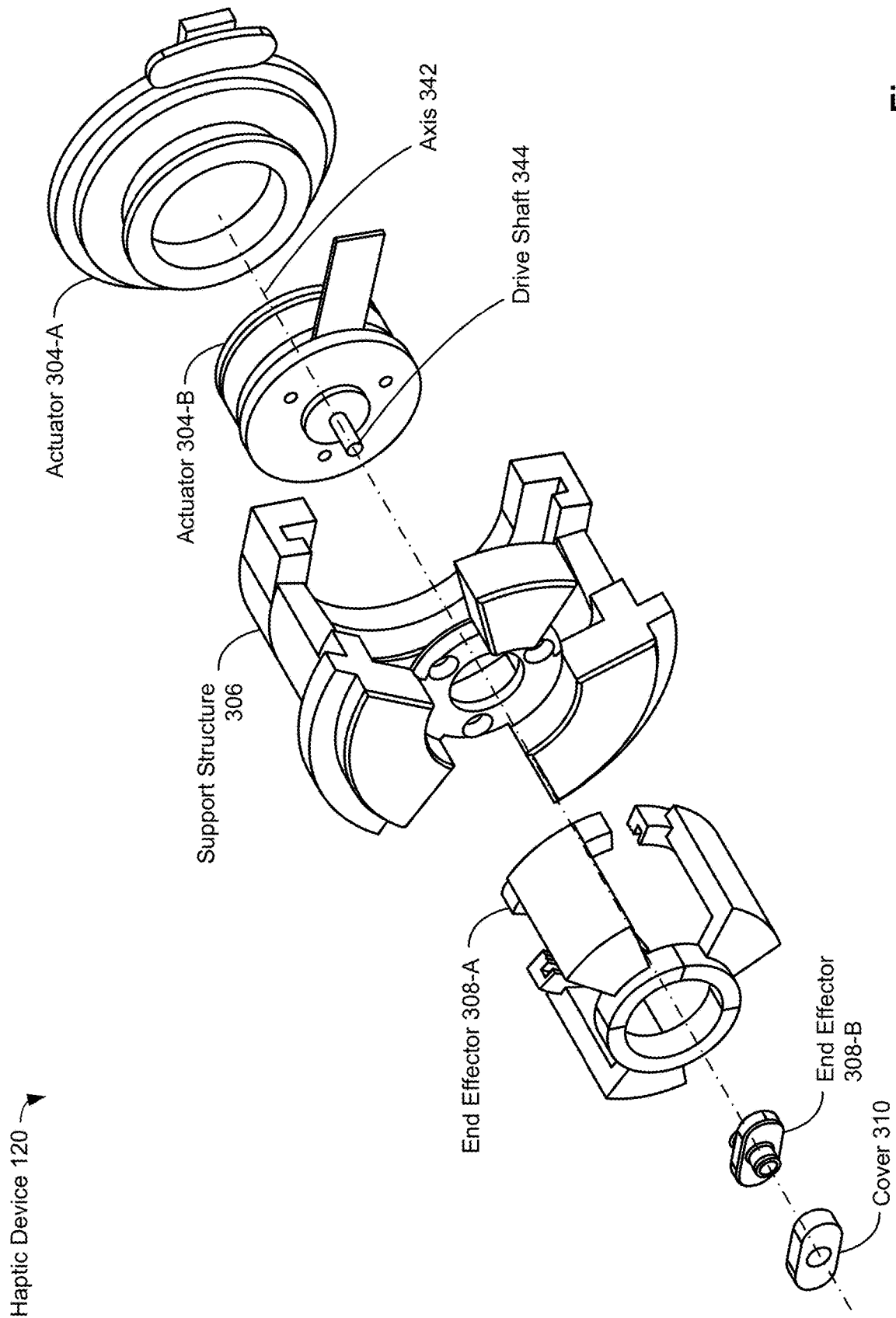

HAPTIC DEVICE FOR CREATING VIBRATION-, PRESSURE-, AND SHEAR-BASED HAPTIC CUES

RELATED APPLICATIONS

This application claims priority to U.S. Provisional Patent Application No. 62/616,369, filed Jan. 11, 2018, which is hereby incorporated by reference in its entirety

TECHNICAL FIELD

This application relates generally to haptic stimulation, including but not limited to creating haptic stimulations on users of virtual and/or augmented reality devices.

BACKGROUND

Virtual and augmented reality devices have wide applications in various fields, including engineering design, medical surgery practice, military simulated practice, and video gaming. Haptic or kinesthetic stimulations recreate the sense of touch by applying forces, vibrations, or motions to a user, and are frequently implemented with virtual and augmented reality devices. In certain applications, haptic stimulations are desired at locations where dexterity and motion of the user cannot be impeded. Conventional haptic devices that are to be worn, however, are cumbersome and therefore impede dexterity and motion of the user. Furthermore, conventional haptic devices are typically limited to one type of haptic stimulation, typically vibration (i.e., information transfer is one dimensional). Challenges persist in creating haptic devices with compact designs that are able to create multiple types of haptic stimulations (i.e., a single device with multi-dimensional information transfer capabilities).

SUMMARY

Accordingly, there is a need for devices and systems that do not impede dexterity and motion of a user (e.g., a compact design), and that are able to create multiple haptic stimulations to increase information transfer to a user. One solution is a haptic device that includes novel haptic assemblies therein. Specifically, the haptic assemblies each include, in a compact design, an actuator and an end effector, which are configured to deliver unique haptic cues to a user. In this way, the haptic device itself is able to create different haptic cues depending on the virtual- or augmented-reality environment. In some instances, the novel haptic device described herein can transfer approximately 2.15 bits of information (per unit of time) to the user/wearer, whereas conventional devices can only transfer approximately 0.5 bits of information to the user. Furthermore, due to its compact design, multiple instances of the haptic device described herein can form an array of haptic devices. In doing so, information transfer to a user can be increased by orders of magnitude.

(A1) In accordance with some embodiments, the solution explained above can be implemented on a haptic device (e.g., the haptic device 120 in FIG. 1) that includes a first haptic assembly, comprising: (i) a first end effector and (ii) a first actuator coupled with the first end effector. The first actuator is configured to move the first end effector in one or more first directions. Further, the first haptic assembly is configured to create a first haptic stimulation or a second haptic stimulation (e.g., haptic cues), felt by a wearer of the haptic device, when the first actuator moves the first end effector in the one or more first directions. The haptic device also includes a second haptic assembly, comprising: (i) a second end effector and (ii) a second actuator, different from and positioned beneath the first actuator, coupled with the second end effector. The second actuator is configured to move the second end effector in one or more second directions. Further, the second haptic assembly is configured to create a third haptic stimulation, felt by the wearer of the haptic device, when the second actuator moves the second end effector in the one or more second directions. Importantly, the first, second, and third haptic stimulations are different types of haptic stimulations.

(A2) In accordance with some embodiments, a method is provided that is used to create haptic stimulations. The method is performed by the haptic device of (A1). The method comprises receiving, by the haptic device, an instruction (e.g., from a computer system 130, FIG. 1) to transition the first actuator of the first haptic assembly from a first state to a second state (e.g., from an idle state to an active state), where the first actuator is configured to move a first end effector in one or more first directions once transitioned to the second state. The method further includes, in response to receiving the instruction, transitioning (e.g., activating) the first actuator to the second state based on the instruction, where the first haptic assembly creates a first haptic stimulation or a second haptic stimulation, felt by a wearer of the haptic device, when the first actuator moves the first end effector in the one or more first directions. To further illustrate, the haptic device can be in communication with a computer system (e.g., a virtual reality device and/or an augmented reality device), and the haptic device can stimulate the body based on an instruction from the computer system. As an example, the computer system may display media content to a user (e.g., via a head-mounted display), and the computer system may also instruct the haptic device to create haptic stimulations that correspond to the media content displayed to the user and/or other information collected by the haptic device (e.g., via sensors included with the haptic device) and/or the head-mounted display.

(A3) In accordance with some embodiments, a wearable device to be worn by a user is provided. The wearable device includes an array of haptic devices (e.g., the haptic device array 400, FIG. 4A). Each haptic device in the array is an instance of the haptic device of (A1). In some embodiments, at least a subset of haptic devices in the array is activated simultaneously while in other embodiments the haptic devices in the array are activated individually.

(A4) In some embodiments of any of A1-A3, the first actuator is configured to: (i) vibrate (i.e., move the first end effector in the one or more first directions at a predetermined frequency, such as 20, 70, or 200 Hz) the first end effector to create the first haptic stimulation and (ii) move the first end effector in one of the one or more first directions to create the second haptic stimulation. Furthermore, the second actuator is configured to rotate the second end effector to create the third haptic stimulation.

(A5) In some embodiments of any of A1-A4, the second actuator is positioned closer to the wearer's skin, relative to the first actuator, when the haptic device is attached to the wearer.

(A6) In some embodiments of any of A1-A5, the first end effector and the second end effector are adjacent to (and in some instances, resting on) the wearer's skin when the haptic device is attached to the wearer.

(A7) In some embodiments of any of A1-A6, the haptic device has opposing first and second ends, and the first end effector is an elongated annulus that extends from the first actuator to the second end of the haptic device. Furthermore, the first end effector may at least partially surround and support the second actuator.

(A8) In some embodiments of any of A1-A7, the first actuator is positioned along a first axis (e.g., the axis 342, FIG. 3E), the one or more first directions are opposing directions defined along the first axis, and the first end effector is configured to move back and forth in the one or more first directions along the first axis.

(A9) In some embodiments of A8, the one or more second directions are opposing rotational directions around the first axis, and the second end effector is configured to rotate about the first axis.

(A10) In some embodiments of any of A8-A9, the first and second actuators (and in some embodiments the first and second end effectors) are coaxially aligned along the first axis.

(A11) In some embodiments of any of A1-A10, the haptic device further includes a support structure enclosing, at least partially, the first and second haptic assemblies. The support structure is configured to anchor the first and second haptic assemblies to the wearer.

(A12) In some embodiments of any of A1-A11, the second end effector includes an end cover. In some embodiments, the end cover is made from silicone (or some other polymer with a desired coefficient of friction). Silicon is used to reduce friction and also provides a soft interface with the user's skin.

(A13) In some embodiments of any of A1-A12, (i) the first haptic stimulation involves vibration, (ii) the second haptic stimulation involves pressure, and (iii) the third haptic stimulation involves rotational shear.

(A14) In some embodiments of any of A1-A13, the first haptic assembly is further configured to create the first haptic stimulation and the second haptic stimulation simultaneously.

(A15) In some embodiments of any of A1-A14, the first and second haptic assemblies are further configured to create the first haptic stimulation and/or the second haptic stimulation simultaneously with the third haptic stimulation.

(A16) In some embodiments of any of A14-A15, the first and second haptic assemblies are able to convey at least 2 bits of information to the wearer of the haptic device by creating the first haptic stimulation and/or the second haptic stimulation simultaneously with the third haptic stimulation.

(A17) In some embodiments of any of A1-A16, the haptic device further includes one or more processors in communication with a remote computing device (e.g., the computer system 130, FIG. 1). The one or more processors are configured to receive an instruction from the remote computing device and control operation of the first and second actuators based on the instruction.

(A18) In some embodiments of A17, a first processor of the one or more processors is configured to control operation of the first actuator, and a second processor, distinct from the first processor, of the one or more processors, is configured to control operation of the second actuator.

(A19) In some embodiments of any of A1-A18, the first actuator is a voice coil, and the second actuator is a direct current (DC) motor.

(A20) In some embodiments of any of A1-A19, the haptic device further includes a power supply (e.g., a battery) to power the first and second actuators (and other components of the haptic device if needed).

(A21) In some embodiments of any of A1-A20, the first actuator is configured to: (i) operate at a plurality of amplitudes, (ii) create a vibration haptic stimulation using a first amplitude of the plurality of amplitudes, and (iii) create a pressure haptic stimulation using a second amplitude, greater than the first amplitude, of the plurality of amplitudes.

(A22) In some embodiments of any of A1-A21, the first actuator is configured to: (i) operate at a plurality of frequencies, and (ii) create at least two distinguishable vibrational haptic cues by operating at two different frequencies of the plurality of frequencies.

(A23) In some embodiments of any of A1-A22, the one or more first directions are opposing linear directions (e.g., back and forth or up and down), and the one or more second directions are opposing rotational directions (e.g., clockwise and counterclockwise).

(A24) In some embodiments of any of A1-A23, the second actuator is further configured to: (i) rotate the second end effector below a threshold rotational rate to create a first class of the third haptic stimulation, and (ii) rotate the second end effector at or above the threshold rotational rate to create a second class, distinct from the first class, of the third haptic stimulation.

(A25) In some embodiments of any of A1-A24, the first actuator is configured to move the first end effector in a direction perpendicular to a plane of attachment (e.g., substantially perpendicular to the wearer's skin).

(A26) In some embodiments of any of A1-A25, the second haptic assembly is further configured to create the third haptic stimulation of either sliding over the skin or stretching the skin.

In some embodiments, the haptic device is attached to the user's hand, while in other embodiments the haptic device is worn on other portions of the user's body (e.g., an arm, a wrist, or an ankle) and can be used to stimulate various areas of the body.

Thus, the devices, methods, and systems described herein provide benefits including but not limited to: (i) the ability to stimulate areas of the body that correspond to media content and sensor data; (ii) providing haptic feedback without encumbering free movement of a user's body; and (iii) providing a compact device that can be used to create multiple distinct haptic stimulations.

In accordance with some embodiments, a haptic device includes one or more processors/cores and memory storing one or more programs configured to be executed by the one or more processors/cores. The one or more programs include instructions for performing the operations of any of the methods described herein (A1-A26). In accordance with some embodiments, a non-transitory computer-readable storage medium has stored therein instructions that, when executed by one or more processors/cores of a haptic device, cause the haptic device to perform the operations of any of the methods described herein (A1-A26). In accordance with some embodiments, a system includes a haptic device, a head-mounted display (HMD), and a computer system to provide video/audio feed to the HMD and instructions to the haptic device and the HMD.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures and specification.

FIGS. 3B-1 and 3B-2 show haptic assemblies of the representative haptic device in accordance with some embodiments.

FIG. 3E shows an exploded view of the representative haptic device in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first, second, etc. are, in some instances, used herein to describe various elements, these elements should not be limited by these terms. These terms are used only to distinguish one element from another. For example, a first actuator could be termed a second actuator, and, similarly, a second actuator could be termed a first actuator, without departing from the scope of the various described embodiments. The first actuator and the second actuator are both actuators, but they are not the same actuator.

Figure 1:
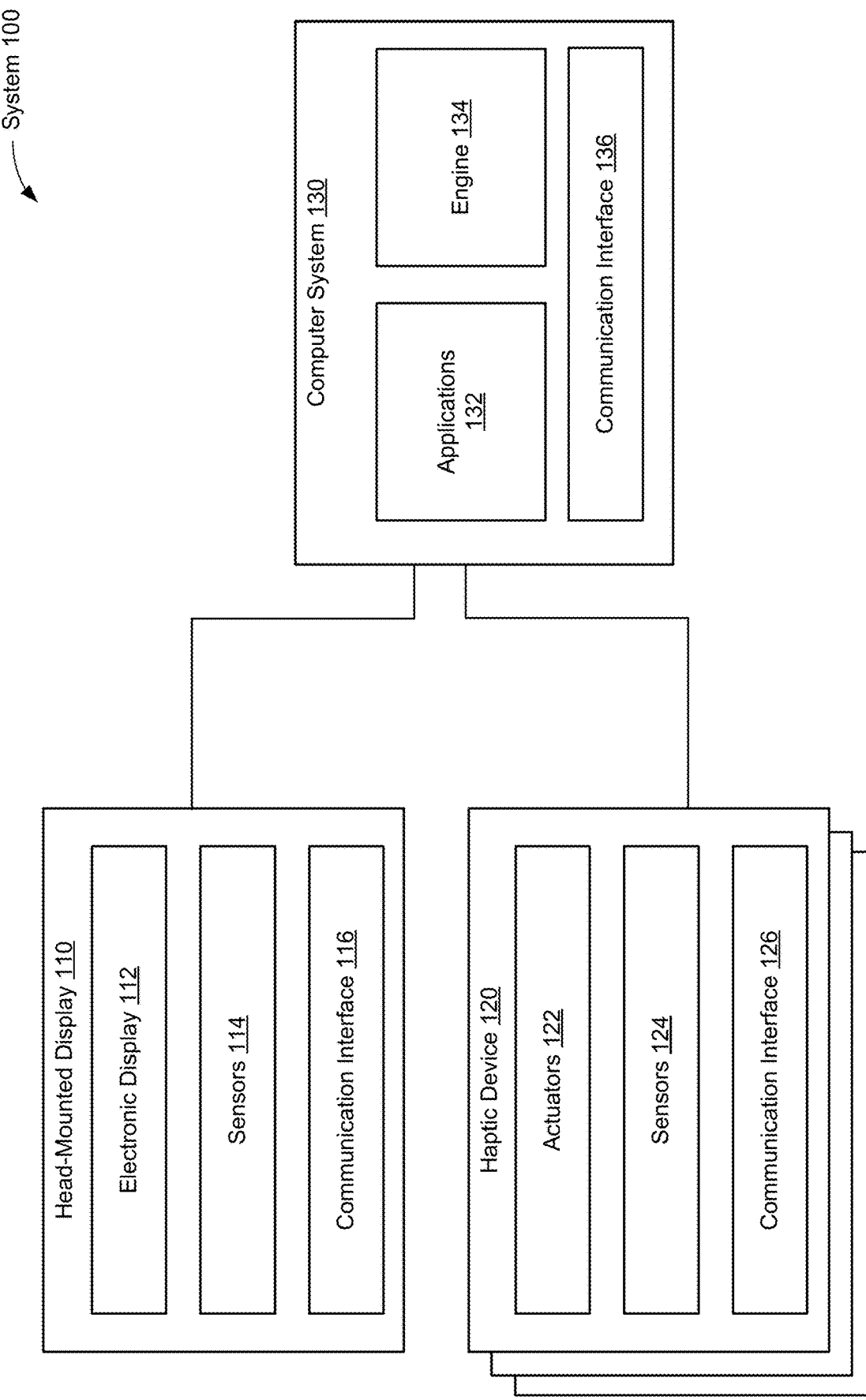
FIG. 1 is a block diagram of a haptics system in accordance with some embodiments.

FIG. 1 is a block diagram of a virtual-reality (and/or augmented reality) system 100 in accordance with various embodiments. While some example features are illustrated, various other features have not been illustrated for the sake of brevity and so as not to obscure pertinent aspects of the example embodiments disclosed herein. To that end, as a non-limiting example, the system 100 includes one or more haptic devices 120, which are used in conjunction with a computer system 130 (sometimes referred to a "remote computer system") and a head-mounted display 110. In some embodiments, the system 100 provides the functionality of a virtual reality device with haptic feedback, an augmented reality device with haptic feedback, or a combination thereof. Additional examples of the system 100 are provided in FIGS. 9-11.

The head-mounted display 110 presents media to a user. Examples of media presented by the head-mounted display 110 include images, video, audio, or some combination thereof. In some embodiments, audio is presented via an external device (e.g., speakers and/or headphones) that receives audio information from the head-mounted display 110, the computer system 130, or both, and presents audio data based on the audio information. Two examples of the head-mounted display 110 are provided in FIGS. 10 and 11.

In some embodiments, the AR system 1000 and the VR system 1100 include both the head-mounted display 110 and the computer system 130.

The head-mounted display 110 includes an electronic display 112, sensors 114, and a communication interface 116. The electronic display 112 displays images to the user in accordance with data received from the computer system 130. In various embodiments, the electronic display 112 may comprise a single electronic display 112 or multiple electronic displays 112 (e.g., one display for each eye of a user).

The sensors 114 include one or more hardware devices that detect spatial and motion information about the head-mounted display 110. Spatial and motion information can include information about the position, orientation, velocity, rotation, and acceleration of the head-mounted display 110. For example, the sensors 114 may include one or more inertial measurement units (IMUs) that detect rotation of the user's head while the user is wearing the head-mounted display 110. This rotation information can then be used (e.g., by the engine 134) to adjust the images displayed on the electronic display 112. In some embodiments, each IMU includes one or more gyroscopes, accelerometers, and/or magnetometers to collect the spatial and motion information. In some embodiments, the sensors 114 include one or more cameras positioned on the head-mounted display 110.

The communication interface 116 enables input and output to the computer system 130. In some embodiments, the communication interface 116 is a single communication channel, such as HDMI, USB, VGA, DVI, or DisplayPort. In other embodiments, the communication interface 116 includes several distinct communication channels operating together or independently. In some embodiments, the communication interface 116 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data collected by the sensors 114 from the head-mounted display 110 to the computer system 130. In such embodiments, the communication interface 116 may also receive audio/visual data to be rendered on the electronic display 112.

The haptic device 120 may be integrated with a wearable device, which includes a garment worn by the user (e.g., a glove, a shirt, or pants). The haptic device 120 includes actuators 122, haptic sensors 124, and a communication interface 126. The haptic device 120 may include additional components that are not shown in FIG. 1, such as a power source (e.g., an integrated battery, a connection to an external power source, a container containing compressed air, or some combination thereof), one or more processors, and memory. Some of these additional components are discussed in further detail below with reference to FIGS. 2A and 2B.

The haptic device 120 is configured to provide haptic feedback (i.e., haptic stimulations or haptic cues) to the user. To accomplish this, the haptic device 120 includes multiple actuators 122 that are configured to apply forces to a user of the haptic device (e.g., a user wearing a wearable device that includes one or more haptic devices 120). As will be explained in greater detail below, the actuators 122 are able to create different haptic stimulations by acting alone, or by acting in consort. The haptic device 120 is configured to create at least three distinct haptic stimulations: (i) vibration, (ii) pressure, and (iii) shear. A first actuator (e.g., the actuator 304-A in FIG. 3A) is configured to create the vibration-type haptic stimulations and the pressure-type haptic stimulations. A second actuator (e.g., the actuator 304-B in FIG. 3E) is configured to create the shear-based haptic stimulations. Moreover, when the first and second actuators operate together, the actuators 122 are able to create additional haptic stimulations.

The haptic sensors 124 include one or more hardware devices that detect spatial and motion information about the haptic device 120. Spatial and motion information can include information about the position, orientation, velocity, rotation, and acceleration of the haptic device 120 or any subdivisions of the haptic device 120, such as fingers, fingertips, knuckles, the palm, or the wrist when the haptic device 120 is part of a glove. The haptic sensors 124 may be IMUs, as discussed above with reference to the sensors 114. As discussed below with reference to FIG. 2B, the sensors 124 may also include feedback sensors associated with operations of the actuators 122. For example, a laser displacement sensor can be used to measure displacement of an end-effector controlled by the actuator 304-A while a force (or pressure) sensor measures resulting forces, moments, and accelerations created by the actuator 304-A. Similarly, a motor encoder (such as a Hall-effect sensor) can measure displacement of the actuator 304-B while an accelerometer measures noise created by the actuators 122.

The haptic communication interface 126 enables input and output to the computer system 130. In some embodiments, the haptic communication interface 126 is a single communication channel, such as USB. In other embodiments, the haptic communication interface 126 includes several distinct communication channels operating together or independently. For example, the communication interface 126 may include separate communication channels for receiving control signals for the actuators 122 and sending data from the haptic sensors 124 to the computer system 130. The one or more communication channels of the haptic communication interface 126 can be implemented as wired or wireless connections. In some embodiments, the haptic communication interface 126 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

The computer system 130 is a computing device that executes virtual reality applications and/or augmented reality applications to process input data from the sensors 114 on the head-mounted display 110 and the haptic sensors 124 on the haptic device 120. The computer system 130 provides output data for (i) the electronic display 112 on the head-mounted display 110 and (ii) the haptic device 120 (e.g., the processors 128 of the haptic device 120, FIG. 2A). The systems in FIGS. 9-11 each include an instance of a computer system 130.

In some embodiments, the computer system 130 sends instructions (e.g., the output data) to the haptic device 120. In response to receiving the instructions, the haptic device 120 creates one or more haptic stimulations (e.g., using one or more of the actuators 122). Alternatively, in some embodiments, the computer system 130 sends instructions to an external device, such as a wearable device or some other Internet of things (IOT) device, and in response to receiving the instructions, the external device creates one or more haptic stimulations through the haptic device 120 (e.g., the output data bypasses the haptic device 120). Although not shown, in the embodiments that include a distinct external device, the external device may be connected to the head-mounted display 110, the haptic device 120, and/or the computer system 130 via a wired or wireless connection.

The computer system 130 can be implemented as any kind of computing device, such as an integrated system-on-a-chip, a microcontroller, a console, a desktop or laptop computer, a server computer, a tablet, a smart phone, or other mobile device. Thus, the computer system 130 includes components common to typical computing devices, such as a processor, random access memory, a storage device, a network interface, an I/O interface, and the like. The processor may be or include one or more microprocessors or application specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either a wired or a wireless interface. The I/O interface interfaces the processor to peripherals (not shown) such as, for example and depending upon the computing device, sensors, displays, cameras, color sensors, microphones, keyboards, and USB devices.

In the example shown in FIG. 1, the computer system 130 further includes virtual-reality (and/or augmented-reality) applications 132 and a virtual reality (and/or augmented reality) engine 134. In some embodiments, the virtual-reality applications 132 and the virtual-reality engine 134 are implemented as software modules that are stored on the storage device and executed by the processor. Some embodiments of the computer system 130 include additional or different components than those described in conjunction with FIG. 1. Similarly, the functions further described below may be distributed among components of the computer system 130 in a different manner than is described here.

Each virtual-reality application 132 is a group of instructions that, when executed by a processor, generates virtual reality content for presentation to the user. A virtual-reality application 132 may generate virtual-reality content in response to inputs received from the user via movement of the head-mounted display 110 or the wearable device 120. Examples of virtual-reality applications 132 include gaming applications, conferencing applications, and video playback applications.

The virtual-reality engine 134 is a software module that allows virtual-reality applications 132 to operate in conjunction with the head-mounted display 110 and the haptic device 120. In some embodiments, the virtual-reality engine 134 receives information from the sensors 114 on the head-mounted display 110 and provides the information to a virtual-reality application 132. Based on the received information, the virtual-reality engine 134 determines media content to provide to the head-mounted display 110 for presentation to the user via the electronic display 112 and/or a type of haptic feedback to be created by the haptic device 120. For example, if the virtual-reality engine 134 receives information from the sensors 114 on the head-mounted display 110 indicating that the user has looked to the left, the virtual-reality engine 134 generates content for the head-mounted display 110 that mirrors the user's movement in a virtual environment.

Similarly, in some embodiments, the virtual-reality engine 134 receives information from the haptic sensors 124 on the haptic device 120 and provides the information to a virtual-reality application 132. The application 132 can use the information to perform an action within the virtual world of the application 132. For example, if the virtual-reality engine 134 receives information from the sensors 124 that the user has raised his hand, a simulated hand in the virtual-reality application 132 lifts to a corresponding height. As noted above, the information received by the virtual-reality engine 134 can also include information from the head-mounted display 110. For example, cameras on the head-mounted display 110 may capture movements of the haptic device 120, and the application 132 can use this additional information to perform the action within the virtual world of the application 132.

The virtual-reality engine 134 may also provide feedback to the user that the action was performed. The provided feedback may be visual via the electronic display 112 in the head-mounted display 110 and/or haptic via one or more of the actuators 122 in the haptic device 120. For example, if a haptic device 120 is attached to a user's forearm, one or more actuators 122 of the haptic device 120 may create one or more pressure sensations on the user's forearm to simulate the sensation of an avatar in a virtual-reality video game touching the arm of the user's avatar. To do this, the haptic device 120 activates the one or more actuators 122 based on an instruction from the computer system 130. A representative haptic device 120 is discussed below with reference to FIGS. 3A-3H.

As mentioned above, the haptic stimulations created by the haptic device 120 can correspond to data displayed by the head-mounted display 110 (e.g., an avatar touching the user's avatar). Thus, the haptic device 120 is used to further immerse the user in virtual and/or augmented reality experience such that the user not only sees (at least in some instances) the data on the head-mounted display 110, but the user may also "feel" certain aspects of the displayed data. Moreover, the haptic device 120 is designed to not restrict movement of the user's body. Consequently, the wearer experiences far less unwanted encumbrances when wearing the haptic device 120, relative to conventional wearable haptic devices. The computer system 130 also has a communication interface 136, which can be used to communicate with the head mounted display 110, the haptic device 120, and/or other devices.

Figure 2A:
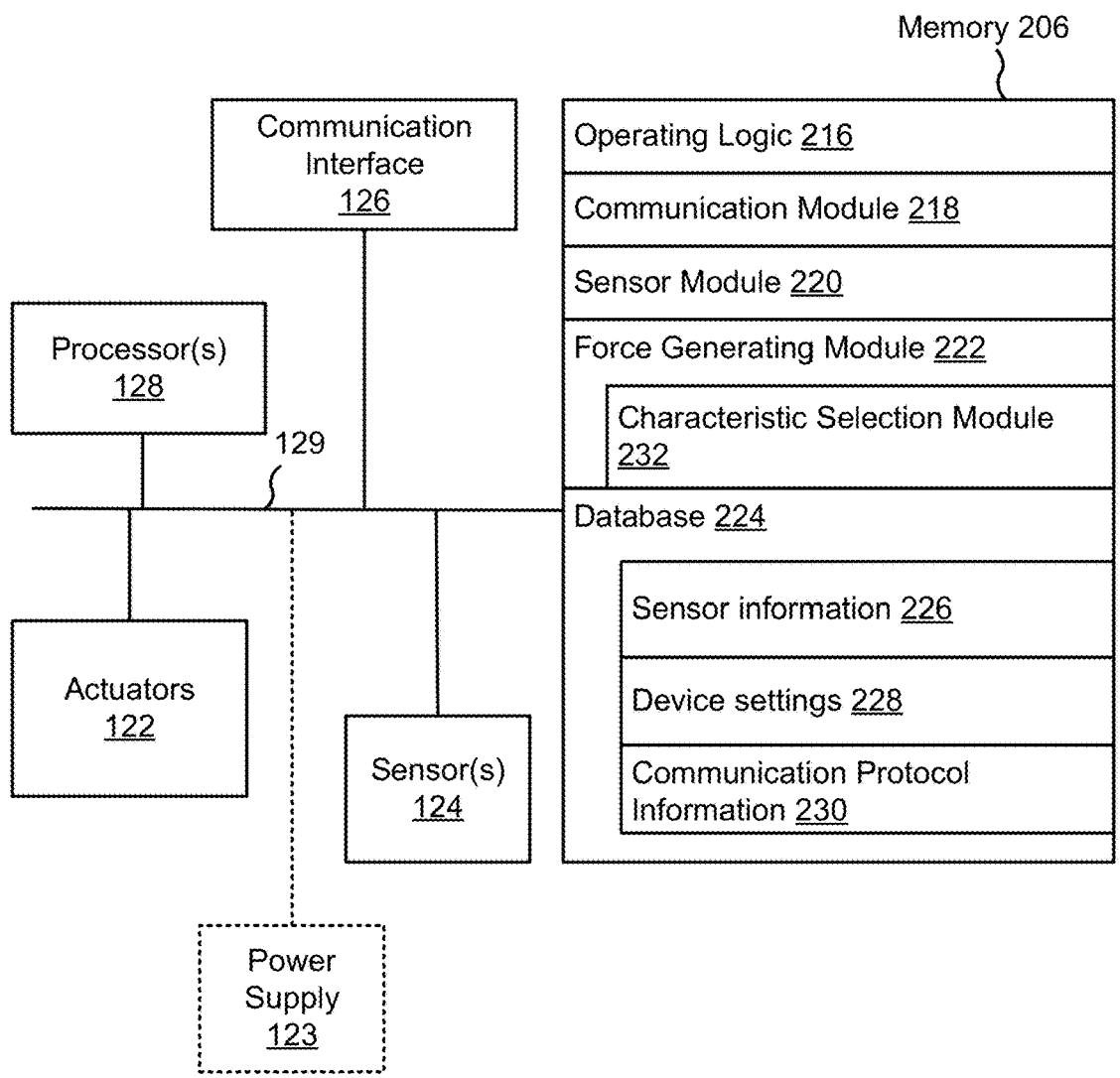
FIG. 2A is a block diagram illustrating an example haptic device in accordance with some embodiments.

FIG. 2A is a block diagram illustrating a representative haptic device 120 in accordance with some embodiments. In some embodiments, the haptic device 120 includes one or more processing units (e.g., CPUs, microprocessors, and the like) 128, a communication interface 126 (discussed above with reference to FIG. 1), memory 206, a plurality of actuators 122, and one or more communication buses 129 for interconnecting these components (sometimes called a chipset). In some embodiments, the haptic device 120 includes one or more sensors 124 as described above with reference to FIG. 1.

The plurality of actuators 122 include, for example, hardware capable of generating forces (e.g., vibrational forces, pressure forces, and rotational forces). Example actuators include, but are not limited to, a voice coil for creating vibrational and pressure forces and a direct current (DC) motor for creating the rotational/shear forces. Other actuators can also be used in the haptic device 120, so long as the actuators are able to create vibrational forces, pressure forces, and rotational forces. Examples of the voice coil and DC motor are Tectonic Elements TEAX19C01-8 and Maxon Precision Motors EC 20 flat, respectively.

The haptic device 120 may also include a power supply 123, such as a battery, to power its various components. Alternatively, in some embodiments, the power supply 123 is part of a wearable device in which the haptic device 120 is integrated.

The memory 206 includes high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory 206, or alternatively the non-volatile memory within memory 206, includes a non-transitory computer-readable storage medium. In some embodiments, the memory 206, or the non-transitory computer-readable storage medium of the memory 206, stores the following programs, modules, and data structures, or a subset or superset thereof:

- operating logic 216, including procedures for handling various basic system services and for performing hardware dependent tasks;
- a communication module 218, which couples to and/or communicates with remote devices (e.g., the computer system 130, other wearable devices, or other haptic devices) in conjunction with the communication interface 126;
- a sensor module 220, which obtains and processes sensor data (e.g., in conjunction with sensors 124) to, for example, determine an orientation of the haptic device 120 and determine states of the actuators 122;
- a force generating module 222, which actuates the actuators 122 to create haptic stimulations. In some embodiments, the module 222 also includes or is associated with a characteristic selection module 232, which is used to select values (e.g., frequency, rotational speed, or amplitude) of actuation for specific actuators 122; and
- a database 224, which stores:
  - sensor information 226, including data received, detected, and/or transmitted by one or more sensors (e.g., the sensors 124 or one or more remote sensors);
  - device settings 228, including operational settings for the haptic device 120 and/or one or more remote devices (e.g., selected values or profiles for actuation); and
  - communication protocol information 230, including protocol information for one or more protocols (e.g., custom or standard wireless protocols, such as Zig-Bee, Z-Wave, etc., and/or custom or standard wired protocols, such as Ethernet).

In some embodiments, the characteristic selection module 232 of the force generating module 222 may be used to select a particular frequency at which an actuator 122 is to operate at. As discussed above, other characteristics for actuations may include rotations per minute (rpm), amplitude, direction, or applied load, and the selection module 232 may select particular values for each of those characteristics. In some embodiments, the selection module 232 selects the values based on information received from the computer system 130 (as explained greater detail below). In some embodiments, the computer system 130 includes the selection module 232 and provides the relevant characteristics to the haptic device 120.

In some embodiments (not shown), the haptic device 120 includes a unique identifier stored in the database 224. In some embodiments, the haptic device 120 sends the unique identifier to the computer system 130 to identify itself to the computer system 130. This is particularly useful when multiple haptic devices are being used concurrently. In this way, the computer system 130 can quickly determine which haptic device to activate Each of the above-identified elements (e.g., modules stored in memory 206 of the haptic device 120) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 206 stores a subset of the modules and data structures identified above. Furthermore, in some embodiments, the memory 206 stores additional modules and data structures not described above.

Figure 2B:
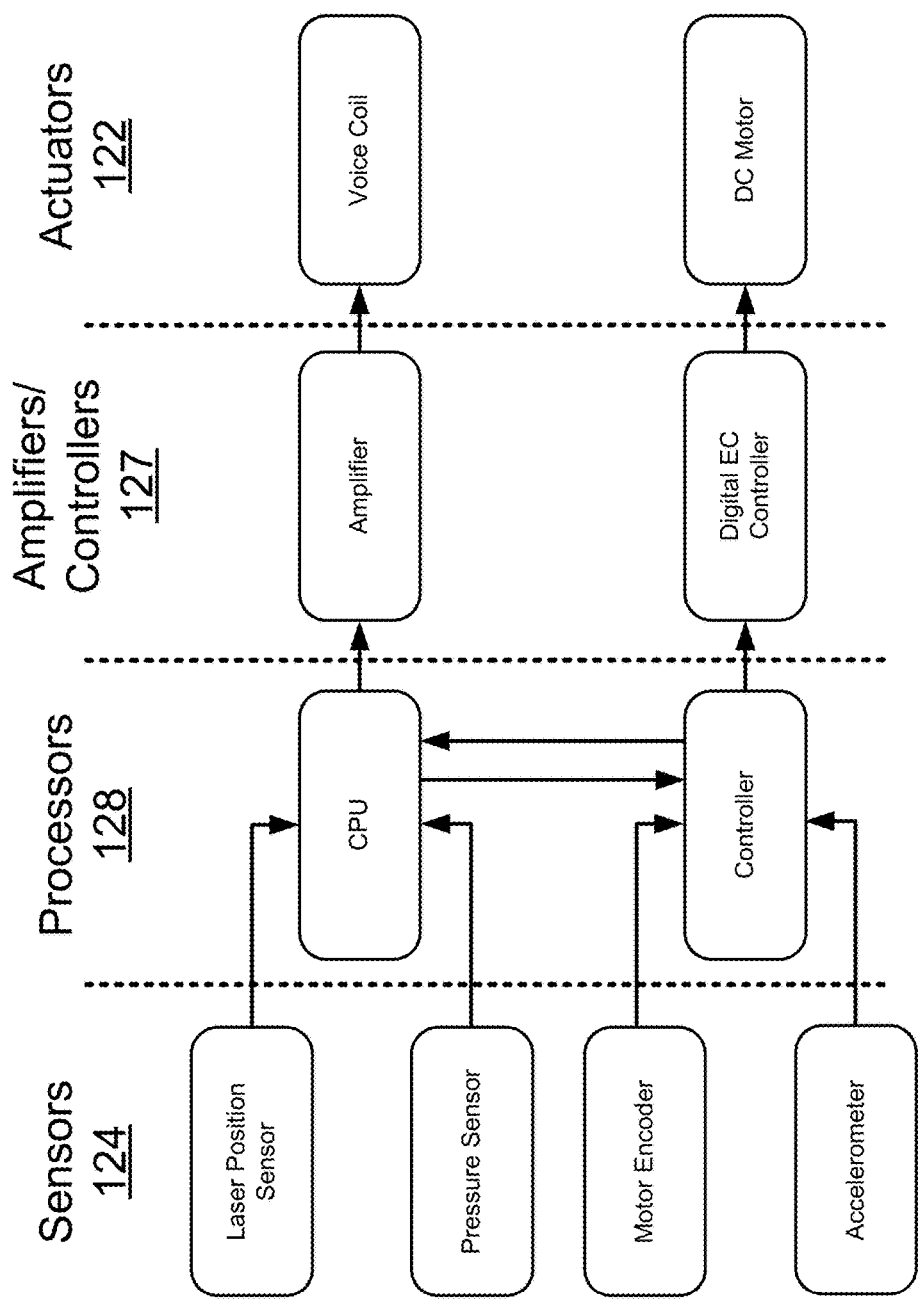
FIG. 2B shows an example system architecture of a representative haptic device in accordance with some embodiments.

FIG. 2B shows an example system architecture 250 of a representative haptic device 120 in accordance with some embodiments. The components in FIG. 2B are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein.

As mentioned above, the sensors 124 can include one or more force sensors that provide information to the processors 128 (e.g., the CPU shown in FIG. 2B). In addition, the sensors 124 may include one or more pressure sensors, such as the pressure sensors 351-A and 351-B in FIG. 3H (e.g., a pressure sensor positioned within the haptic device 120 that measures forces created by the actuator 304-A in FIG. 3F). A laser position sensor can also be used to measure characteristics of the actuator 304-A. The sensors 124 may also include a motor encoder and an accelerometer, which provide information to the processors 128 (e.g., the controller shown in FIG. 2B). In addition, the sensors 124 may include a Hall-effect sensor positioned within the haptic device 120, which measures characteristics of the actuator 304-B (e.g., the actuator 304-B, which may be a DC motor, can have an integrated Hall-effect sensor to measure the rotational speed of the DC motor).

In one example to provide some additional context, the actuator 304-A is a voice coil, which is driven using suitable software (e.g., the Max Cycling 74 software) and an audio interface (e.g., MOTU, Inc., 24Ao) with an audio amplifier (e.g., Maxim Inc., MAX98306). The amplitude, frequency, and duration of the voice coil may be controlled using the software. The actuator 304-B may be a brushless DC motor that is driven using a microcontroller and/or a digital EC speed controller (e.g., Maxon Precision Motors, Inc., DEC module 24/2). The DC motor may be controlled (e.g., using Max) by communicating with the microcontroller through a serial port. It is also noted that, for a single channel, an audio channel from a typical computing device can be used. However, for multiple actuators, either an audio interface (like Motu) or a microcontroller with multiple channel DACs is typically needed. One skilled in the art will appreciate that similar components from various other manufacturers could also be used.

In another example to provide some additional context, a master microcontroller (e.g., Teensy 3.6) communicates with Arduino Nano microcontrollers, which then drive the haptic device 120 (e.g., one haptic device 120 in an array of haptic devices). In this example, the voice coil is controlled with a DAC (MCP4725), two Op-Amps (OPA4196ID, LM675), and a digital potentiometer (MAX5400). The brushless DC motor is driven by a digital EC speed controller (Maxon Precision Motors, Inc., DEC module 24/2). Max Cycling 74 software is used as the interface to control and coordinate haptic feedback from the haptic device 120. It is noted that an op amp allows the haptic device 120 to amplify both dc (pressure) and ac (vibrations) inputs.

Figure 3A:
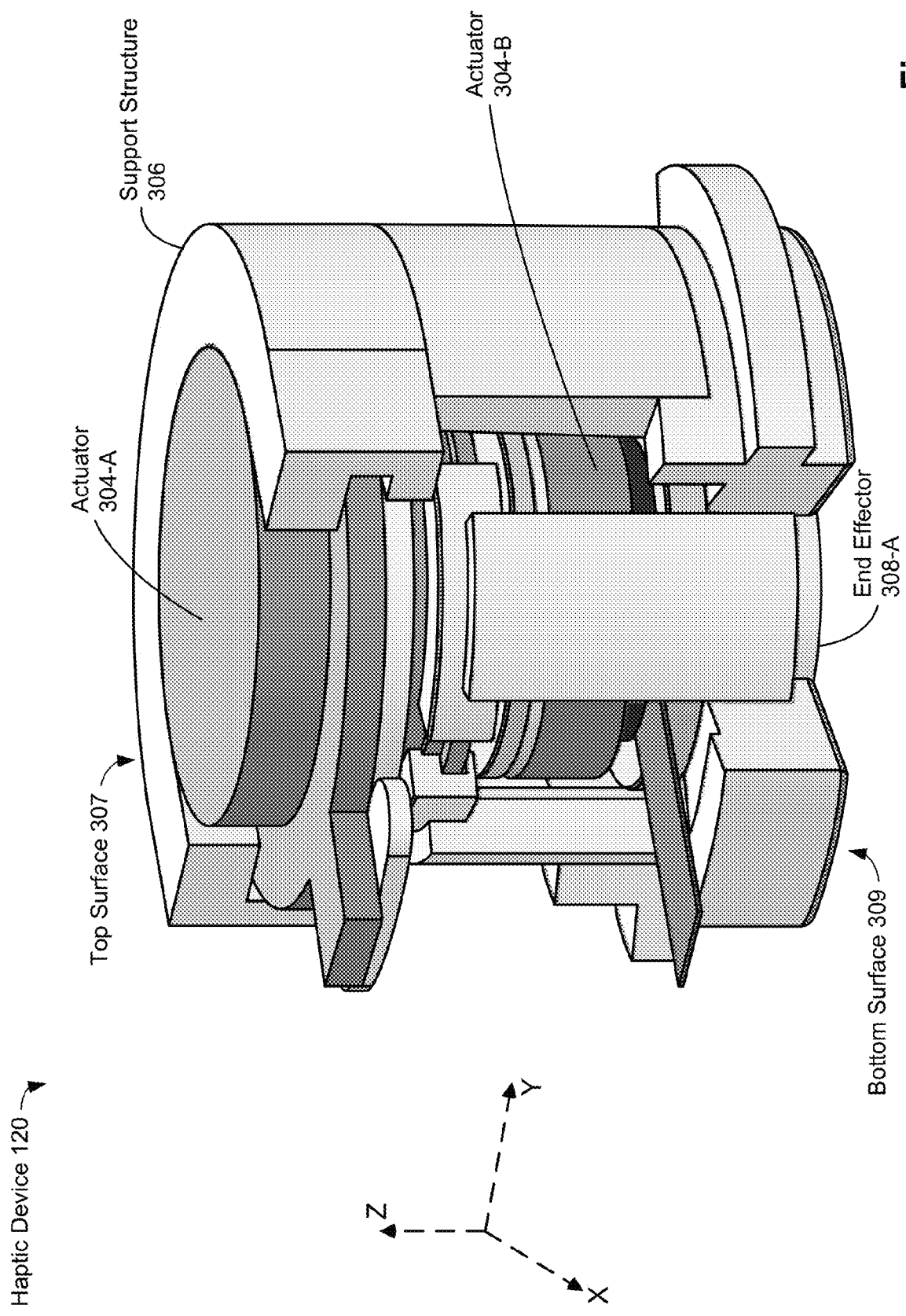
FIG. 3A shows an isometric view of a representative haptic device in accordance with some embodiments.
Figures 1, 3B:
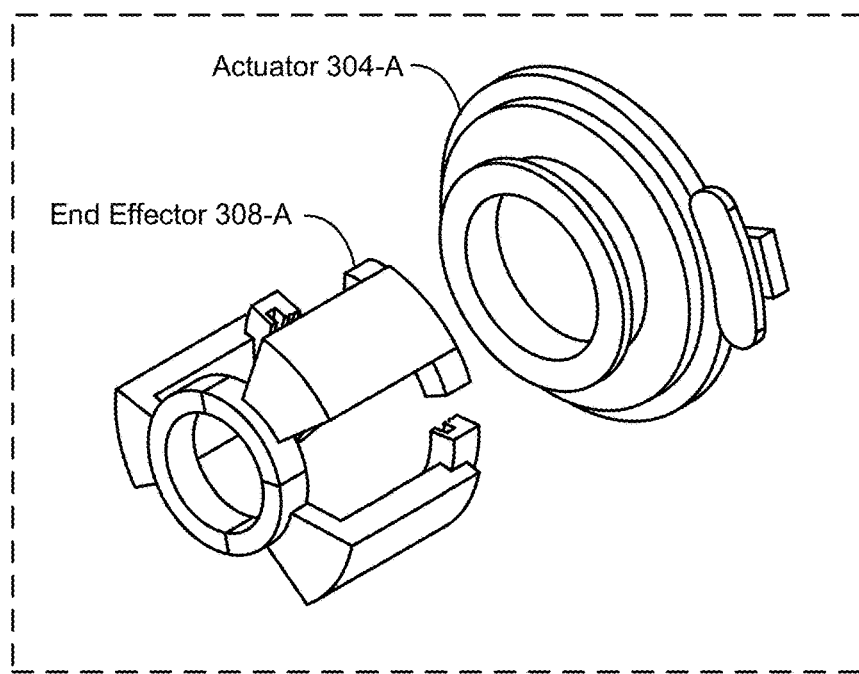
Figures 2, 3B:
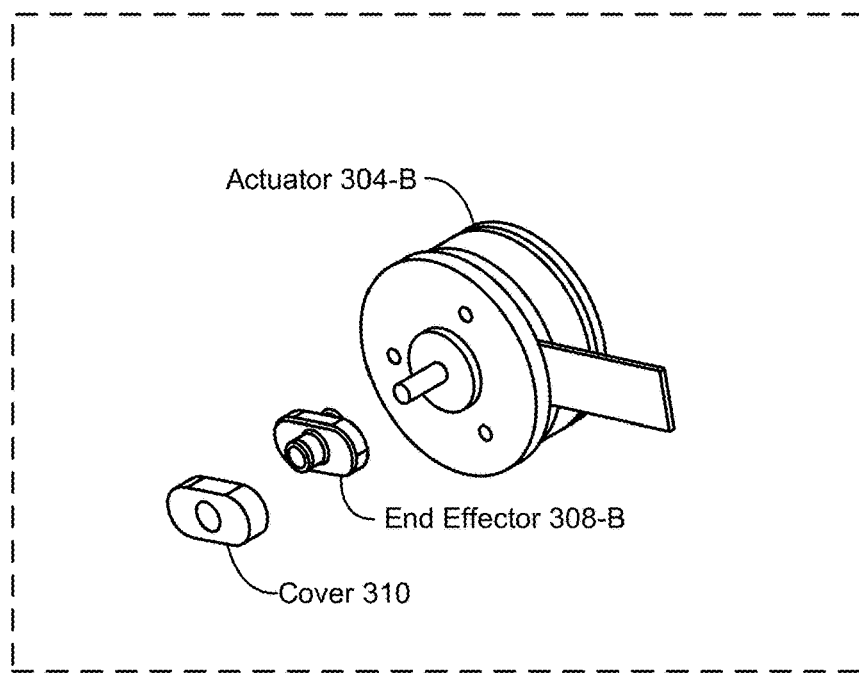
Figure 3C:
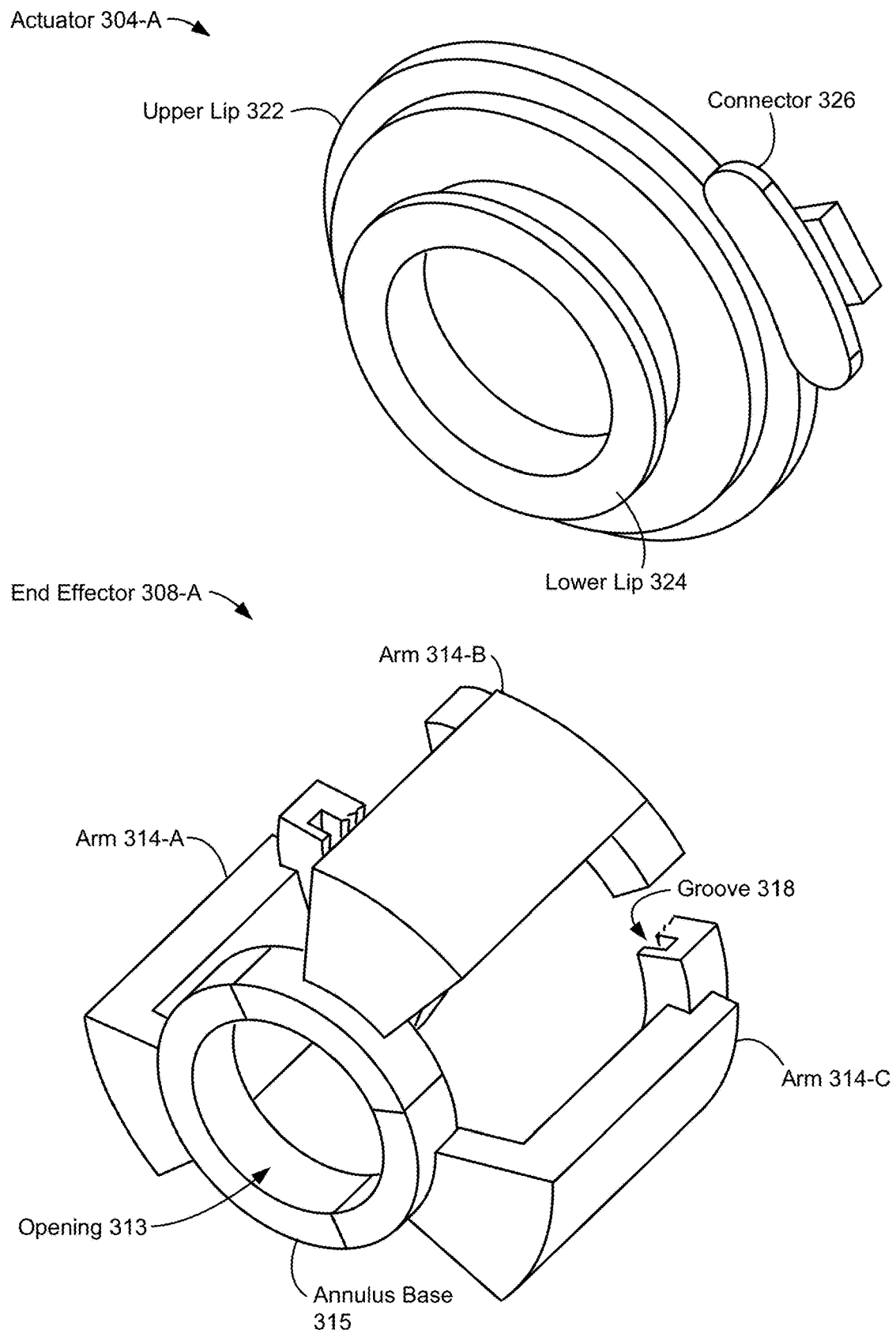
FIG. 3C shows magnified views of an actuator and its associated end effector in accordance with some embodiments.
Figure 3D:
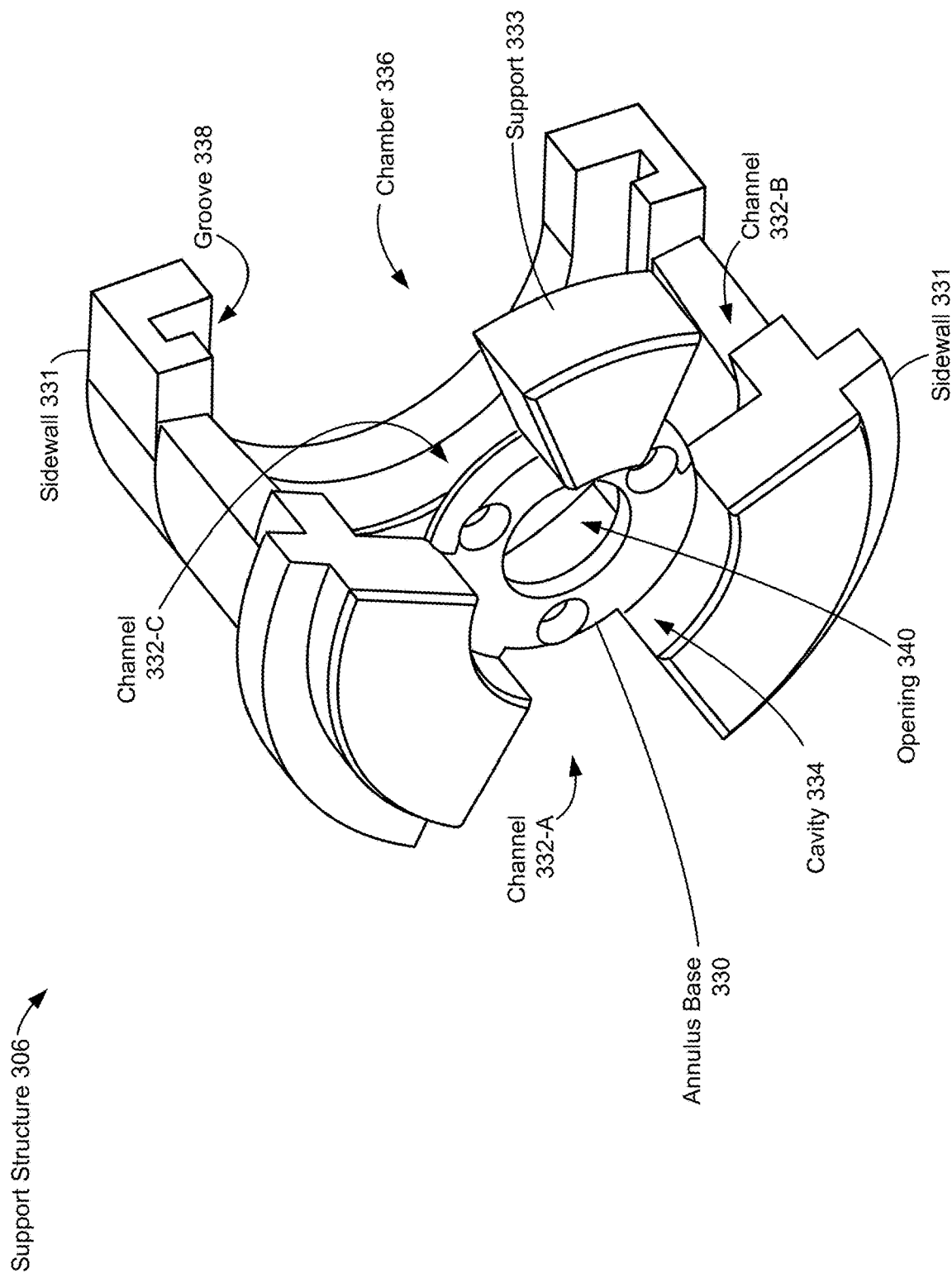
FIG. 3D shows a magnified view of a support structure in accordance with some embodiments.
Figure 3F:
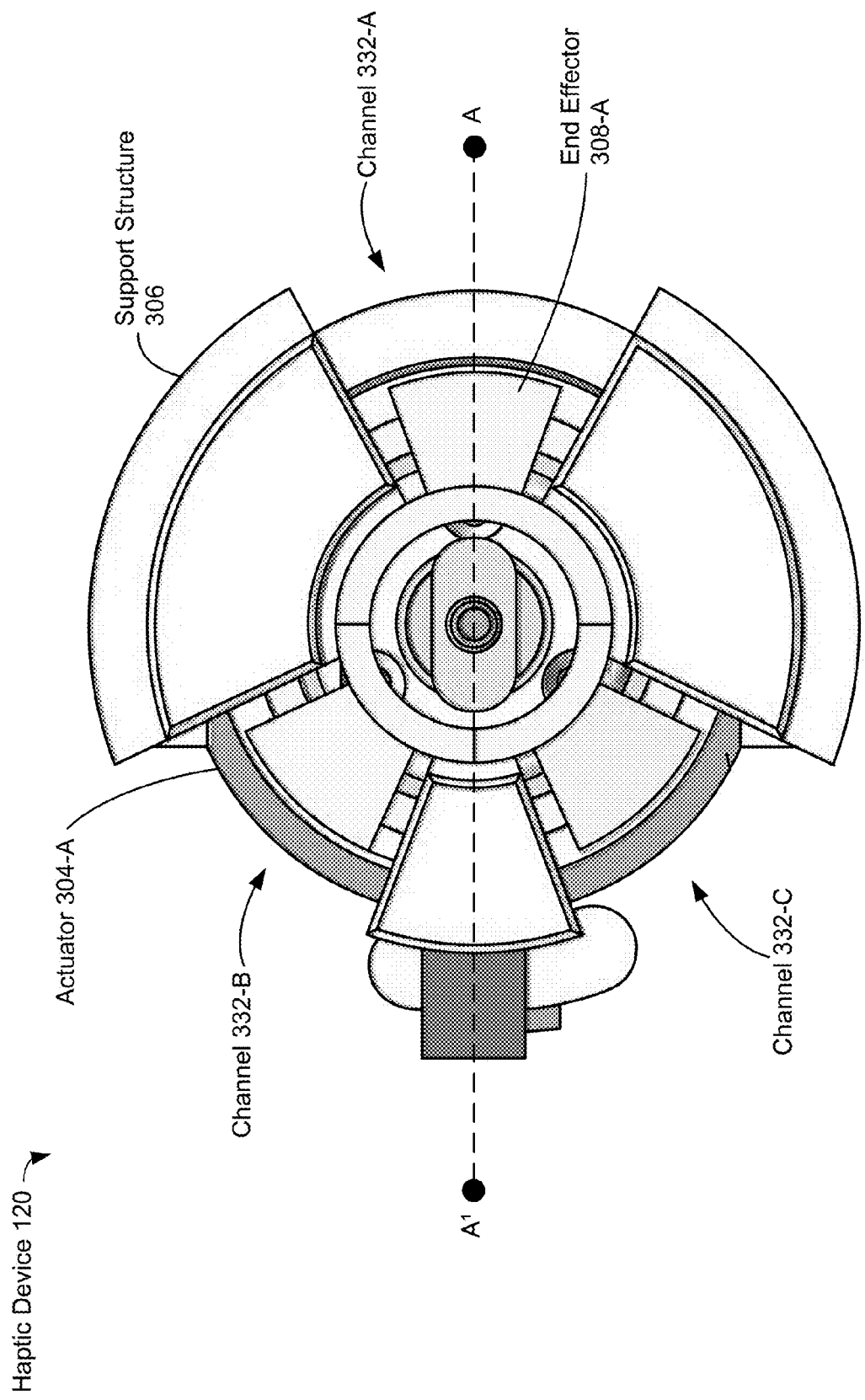
FIG. 3F shows a bottom view of the representative haptic device in accordance with some embodiments.
Figure 3G:
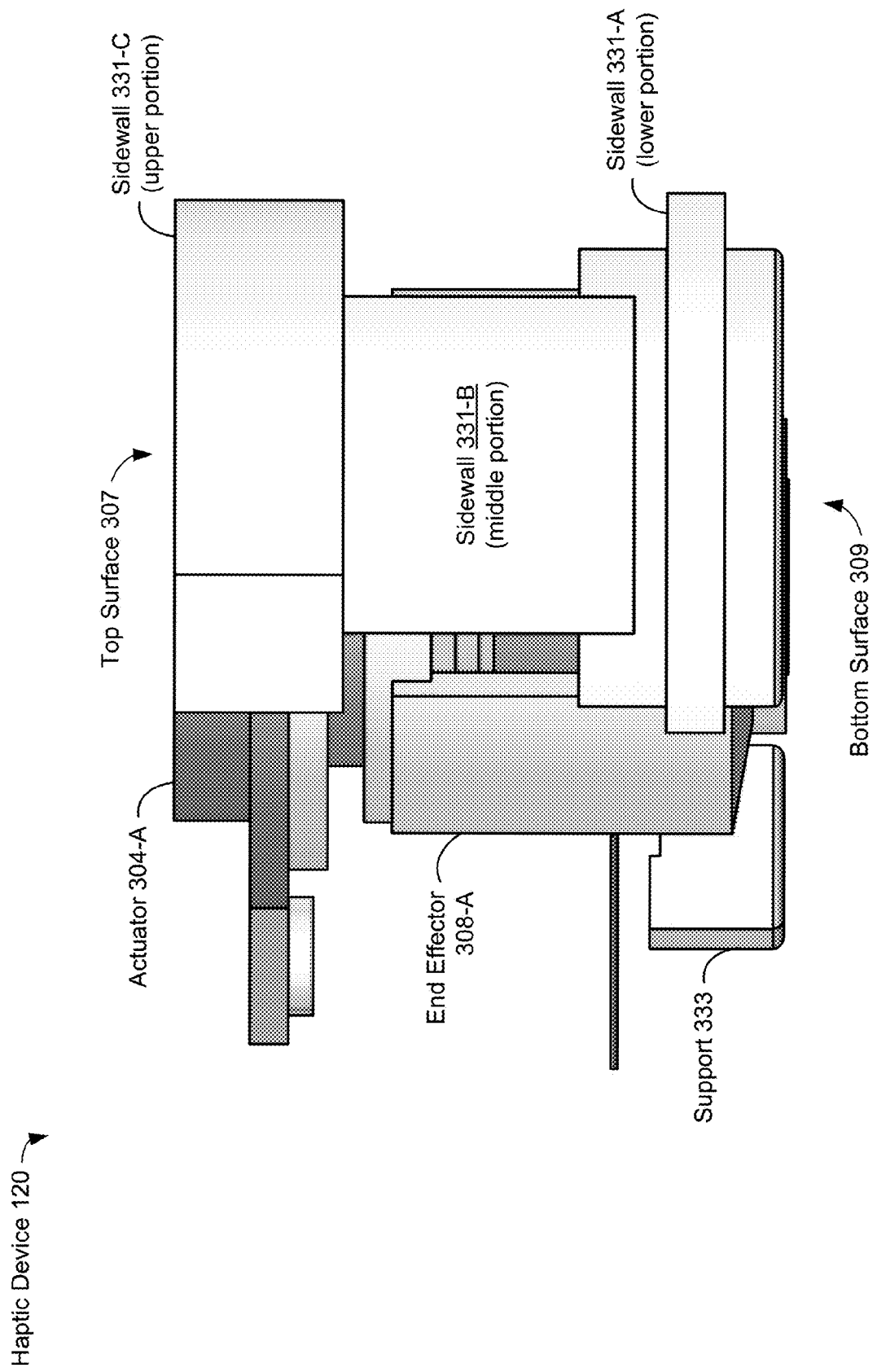
FIG. 3G shows a side view of the representative haptic device in accordance with some embodiments.
Figure 3H:
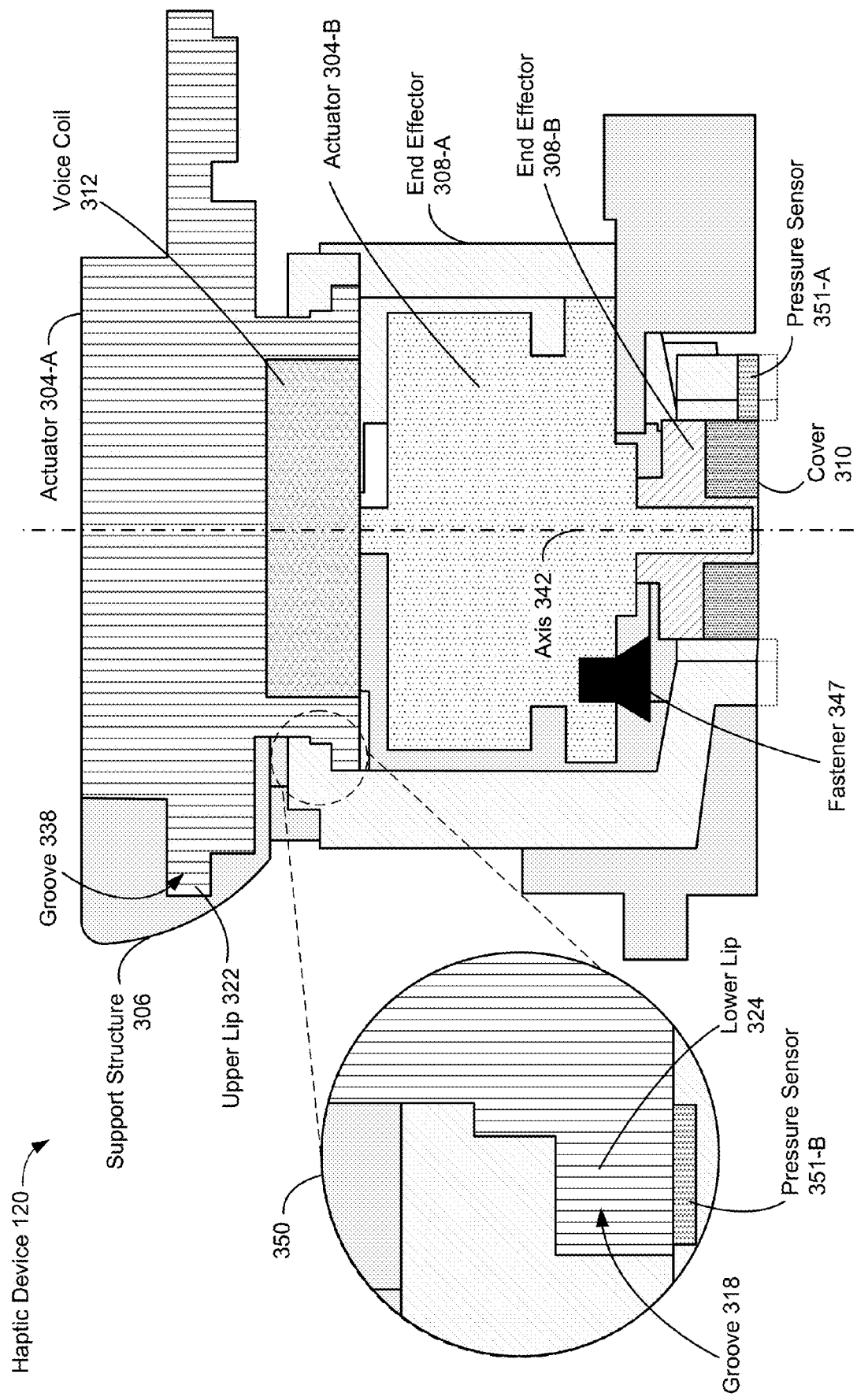
FIG. 3H shows a cross-sectional view (taken along line A-A$^1$ in FIG. 3F) of the representative haptic device in accordance with some embodiments.

FIGS. 3A-3F show various views of a representative haptic device 120 in accordance with some embodiments. In particular, FIG. 3A is an isometric view of the representative haptic device 120, FIG. 3E is an exploded view of the representative haptic device 120, FIG. 3F is a bottom view of the representative haptic device 120, FIG. 3G is a side view of the representative haptic device 120, and FIG. 3H is a cross-sectional view of the representative haptic device 120. Additionally, FIGS. 3B-1 and 3B-2 show haptic assemblies 300 and 302 of the haptic device 120 while FIGS. 3C and 3D show close-up views of various components of the haptic device 120.

Conventional haptic devices are able to create vibrations, which is the most common way to convey a message to a user (e.g., a mobile phone may vibrate to notify the user of a new message or event reminder). However, vibrations alone can be unpleasant and the amount of information that can be conveyed is limited (i.e., a single degree of freedom). Accordingly, the representative haptic device 120 discussed below has three degrees of freedom, meaning that the haptic device 120 can mechanically stimulate the user in three different ways: (i) vibration, (ii) pressure, and (iii) shear (i.e., VPS). Additionally, these three degrees of freedom (i.e., VPS) can be combined in a manner similar to the RGB color model, where the mechanical stimulations can be combined in different ways to produce a broad spectrum of haptic stimulations (also referred to herein as "haptic cues"). Moreover, as will be discussed further below, the representative haptic device 120 can be part of a haptic device array to further increase the degrees of freedom and therefore the information transfer capacity.

The representative haptic device 120 is configured to provide at least three different haptic stimulations to a wearer/user of the haptic device 120: (i) vibration, (ii) pressure, and (iii) shear. In some embodiments, the representative haptic device 120 creates each of the haptic stimulations separately. Alternatively, in some other embodiments, the representative haptic device 120 creates two or more of the haptic stimulations simultaneously. For example, the haptic device 120 may combine a vibration stimulation with a shear stimulation or a pressure stimulation with a shear stimulation. In doing so, the haptic device 120 is able to convey at least two dimensions of information to the wearer of the haptic device 120. For example, a vibration (or pressure) alone may convey a first message (or first information) to the wearer, a shear alone may convey a second message (or second information) to the wearer, and a vibration combined with shear may convey a third message (or third information) to the wearer. The haptic device 120 has a compact design, which is able to create distinct and distinguishable haptic stimulations. In some embodiments, the haptic device 120 alone (e.g., the first and second haptic assemblies 300 and 302, discussed below) is able to convey more than 2 bits of information, per unit of time (e.g., per second), to the wearer of the haptic device 120 by combining different haptic cues simultaneously.

To accomplish this, the haptic device 120 includes two actuators that move (i.e., actuate) respective end effectors. A first actuator 304-A of the two actuators is configured to create the vibration and pressure stimulations through a first end effector 308-A. A second actuator 304-B of the two actuators is configured to create the shear stimulations through a second end effector 308-B (shown in FIG. 3C). As shown in FIG. 3A, the haptic device 120 has a stacked arrangement whereby the first actuator 304-A is positioned above the second actuator 304-B. Put another way, the second actuator 304-B is positioned closer to the wearer's skin, relative to the first actuator 304-A, when the haptic device 120 is attached to the wearer. Importantly, the first end effector 308-A and the second end effector 308-B are adjacent to the wearer's skin when the haptic device 120 is attached to the wearer (e.g., the two end effectors are resting on the wearer's skin while idle). In this way, movement of either end effector 308 is felt by the wearer of the haptic device 120.

To provide some additional context, the haptic device 120 has opposing top and bottom surfaces 307 and 309 (also referred to as opposing first and second ends or opposing first and second surfaces). Therefore, in the stacked arrangement, the first end effector 308-A associated with the first actuator 304-A connects with and extends from the first actuator 304-A towards the bottom surface 309 of the haptic device 120 (e.g., the first end effector 308-A comprises a portion of the bottom surface 309 of the haptic device 120). In some embodiments, the first end effector 308-A is an elongated annulus shape that extends from the first actuator 304-A to the bottom surface 309 of the haptic device 120. The first actuator 304-A is able to create vibration and pressure stimulations that are felt by the wearer of the haptic device 120 through the first end effector 308-A. It is noted that various shapes for the first end effector 308-A can be used and the shape of the first end effector 308-A shown in FIGS. 3B-1 and 3C is one representative example.

The haptic device 120 also includes a support structure 306 positioned around the end-effectors 308 and the actuators 304 that serves two primary purposes: (i) it serves as a reference level to the neutral position of the first actuator 304-A, and (ii) it limits the forces applied directly to the end-effectors 308. The support structure 306 is discussed in more detail below.

With reference to FIGS. 3B-1 and 3B-2, the representative haptic device 120 includes two primary components: (i) a first haptic assembly 300 and (ii) a second haptic assembly 302. The first haptic assembly 300 includes the first actuator 304-A (e.g., an instance of the actuators 122 in FIG. 1) and the first end effector 308-A. Similarly, the second haptic assembly 302 includes the second actuator 304-B (e.g., an instance of the actuators 122 in FIG. 1) and the second end effector 308-B (shown in FIG. 3E). As shown in FIG. 3E, the first end effector 308-A differs from the second end effector 308-B. The support structure 306 mentioned above houses the first and second haptic assemblies.

Figure 6A:
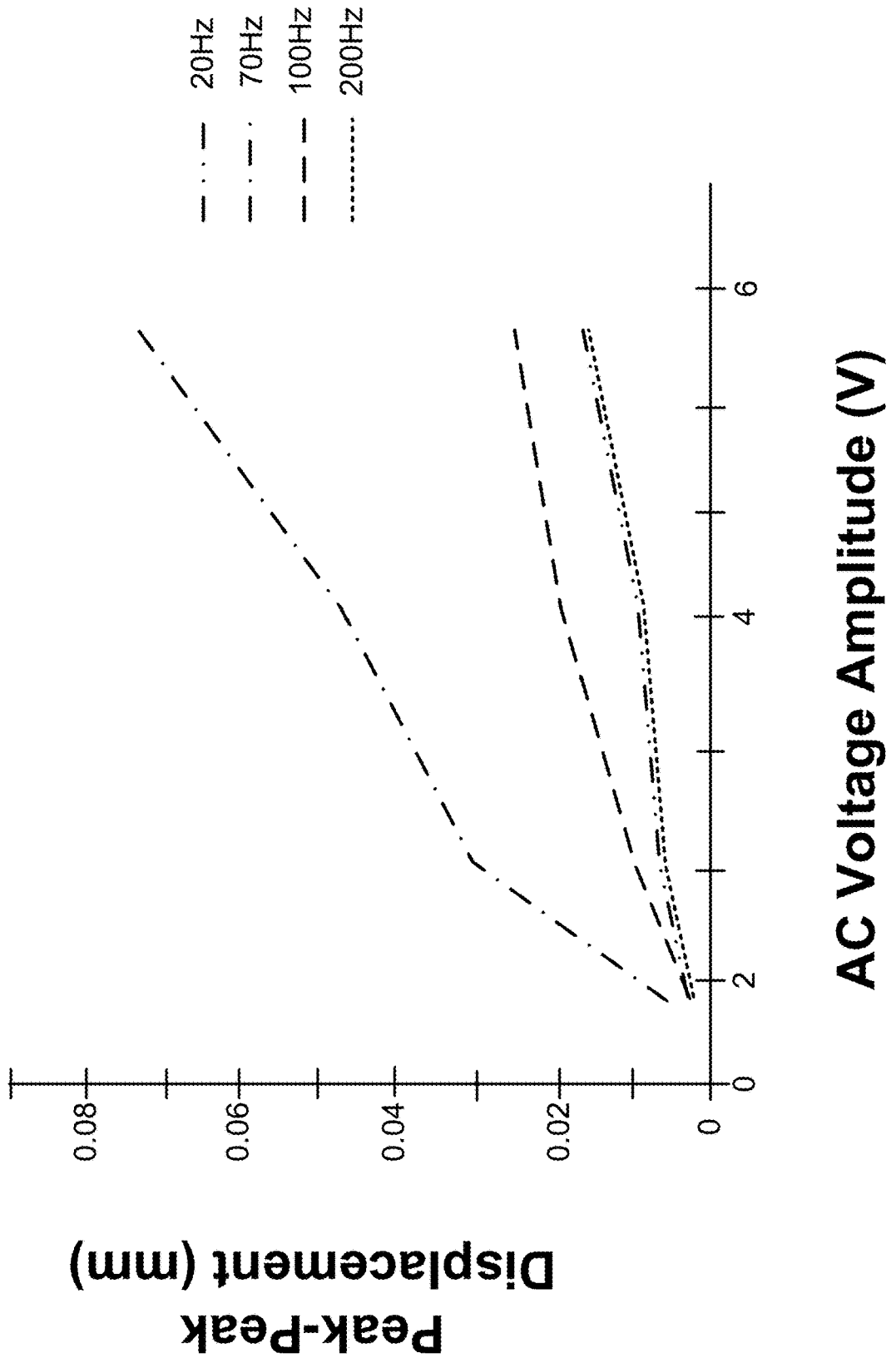
FIG. 6A shows various displacement measurements for vibration stimulations under different frequencies and applied voltages.
Figure 6B:
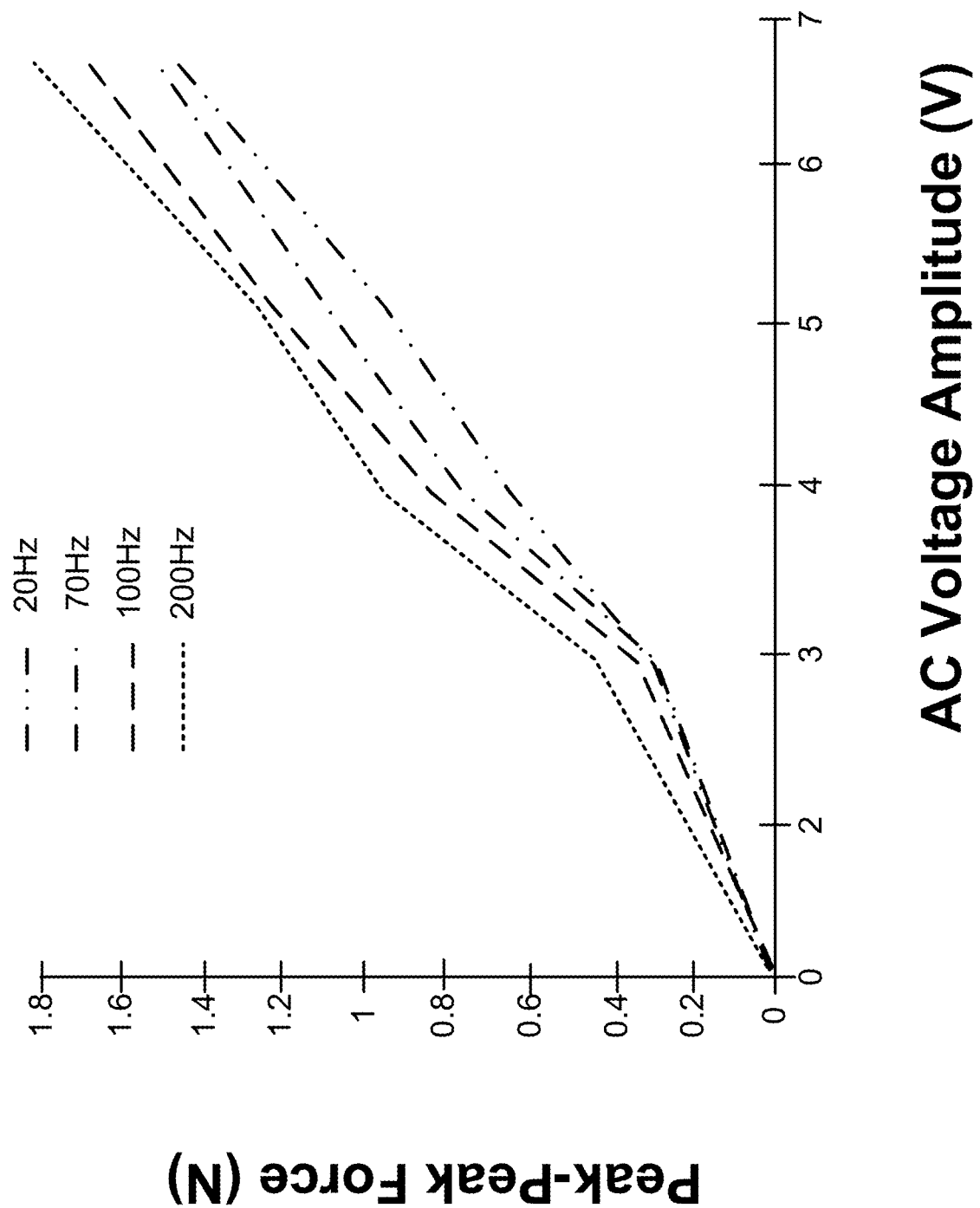
FIG. 6B shows various force measurements for vibration stimulations under different frequencies and applied voltages.
Figure 7:
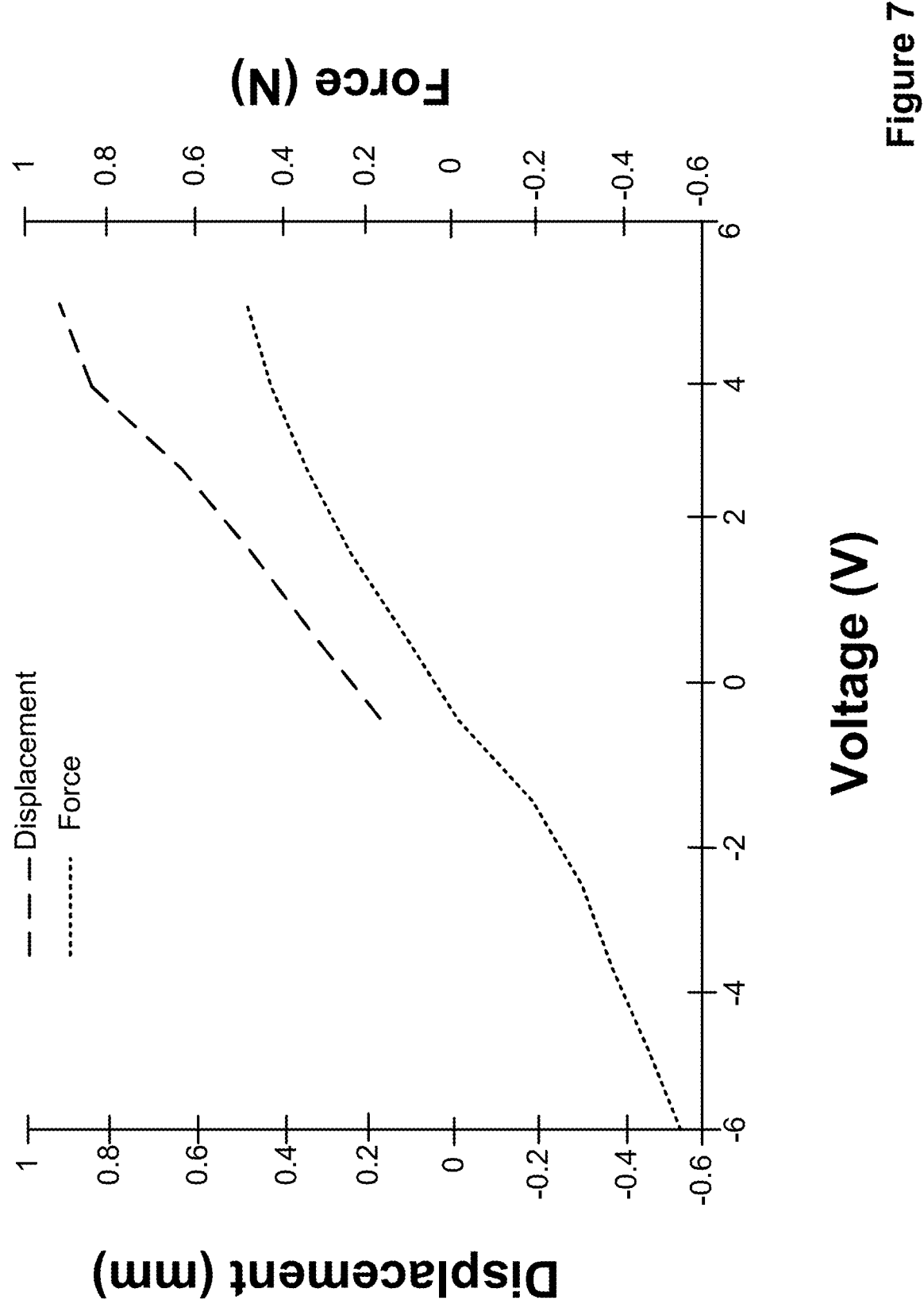
FIG. 7 shows various displacement and force measurements for pressure stimulations.

The first actuator 304-A is configured to move the first end effector 308-A in one or more first directions. For example, the first actuator 304-A may move the first end effector 308-A along (e.g., up and down or back and forth) the Z-axis shown in FIG. 3A. In doing so, the first haptic assembly 300 is configured to create a first haptic stimulation and/or a second haptic stimulation (e.g., haptic cues), felt by a wearer of the haptic device 120, when the first actuator 304-A moves the first end effector 308-A in the one or more first directions. A frequency and/or amplitude of the first actuator 304-A can be varied in order to create the first and second haptic stimulations, and variations thereof. FIGS. 6A, 6B, and 7 show measurements resulting from a frequency and/or amplitude of the first actuator 304-A being varied.

In some embodiments, the first haptic stimulation is a vibration stimulation and the second haptic stimulation is a pressure stimulation. The two main parameters for the vibration stimulation are frequency and amplitude, as noted above. To create the vibration stimulation, the first actuator 304-A moves the first end effector 308-A in the one or more first directions at a frequency, such as 20, 70, or 200 Hz (e.g., to create the vibration stimulation, the first actuator 304-A vibrates the first end effector 308-A). The selected frequency can range from 1 Hz to 400 Hz. Furthermore, the amplitude can be adjusted according to the selected frequency. For example, with a selected frequency of 20 Hz, a peak-to-peak displacement of 0.007 mm can create a perceivable vibration stimulation. With the vibration stimulation, the first end effector 308-A repeatedly contacts the skin of the user (i.e., conveys first information to the user). In some embodiments, values for frequency and amplitude are stored in the memory 206 of the haptic device 120. FIG. 6A shows various displacement measurements for vibration stimulations under different frequencies and applied voltages. FIG. 6B shows various force measurements for vibration stimulations under different frequencies and applied voltages.

To create the pressure stimulation, the first actuator 304-A is configured to move the first end effector 308-A in one of the one or more first directions. For example, the first actuator 304-A pushes the first end effector 308-A away from the bottom surface 309 of the haptic device 120 (e.g., along the Z-axis). In doing so, the first end effector 308-A contacts and pushes on the user's skin. In some embodiments, pressure profiles are used to create various pressure stimulations, which may be stored in the memory 206. Additionally, step up/down and ramp up/down operations may also be used when creating the pressure stimulations. In one example, a minimum displacement of the first end effector 308-A along the Z-axis by 0.45 mm creates a perceivable pressure stimulation. FIG. 7 shows various displacement and force measurements for pressure stimulations.

It is noted that the first actuator 304-A (or the second actuator 304-B) is referred to as being in a "first state" (or idle state, inactive state) when the first end effector 308-A (or the second end effector 308-B) is not being moved. Furthermore, the first actuator 304-A (or the second actuator 304-B) is referred to as being in a "second state" (or active state) when the first end effector 308-A (or the second end effector 308-B) is being moved (e.g., moved from a baseline/resting position). To provide some context, in the "step" output, the second state involves an abrupt change in displacement. The "ramp" output has gradual change of displacement (with a constant rate) until the second state is reached. A patterned output defines a profile for the end-effector 308-A to vary in time.

In some embodiments, a displacement of the first end effector 308-A along the Z-axis with a pressure stimulation is greater than a displacement of the first end effector 308-A along the Z-axis with a vibration stimulation. It is noted that the displacement of the first end effector 308-A can be measured from a baseline/resting position of the first end effector 308-A, which is the position when haptic stimulations are not being created by the haptic device 120 (e.g., when the actuators are in the first state). The first end effector 308-A is shown in the baseline/resting position in FIG. 3H.

Figure 8A:
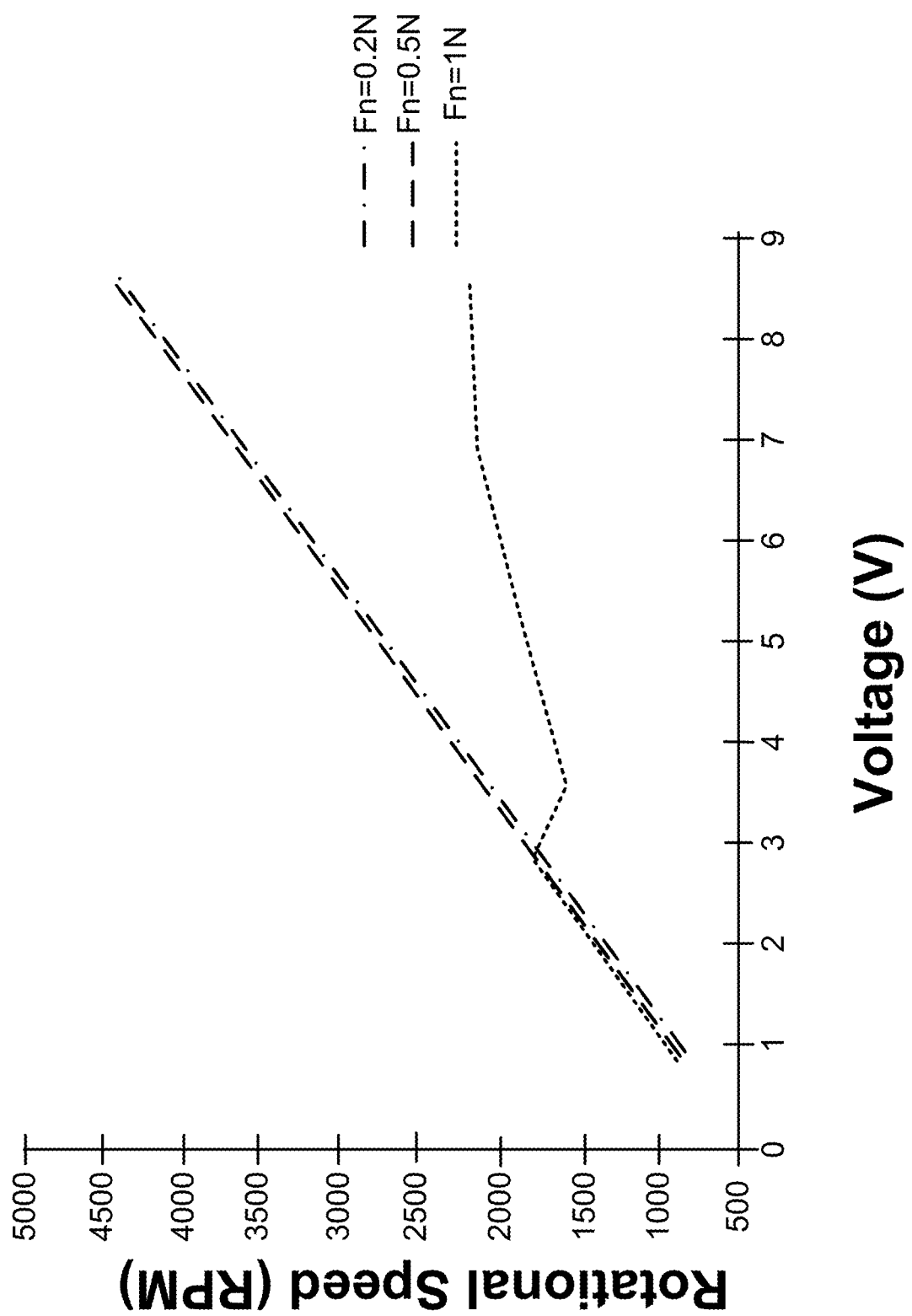
FIG. 8A shows various rotational speeds for shear stimulations under different applied voltages and loads.
Figure 8B:
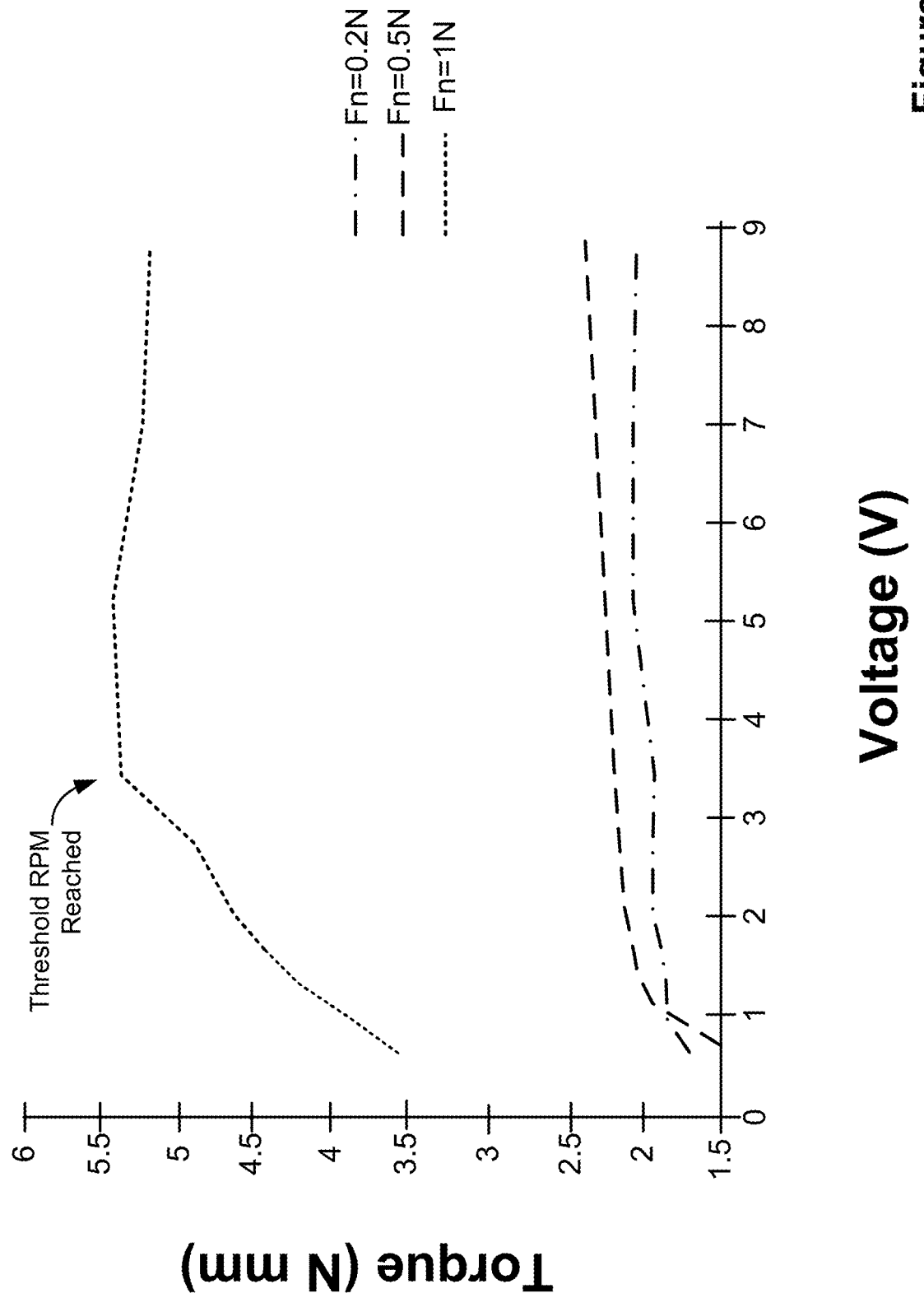
FIG. 8B shows various torque measurements for shear stimulations under different applied voltages and loads.

The second actuator 304-B, in contrast, is configured to move the second end effector 308-B in one or more second directions. For example, the second actuator 304-B may move the second end effector 308-B about (e.g., clockwise and/or counterclockwise) the Z-axis shown in FIG. 3A (e.g., the axis 342 in FIG. 3E). Therefore, the one or more second directions can be opposing rotational directions. In doing so, the second haptic assembly 302 is configured to create a third haptic stimulation, felt by the wearer of the haptic device 120, when the second actuator 304-B moves the second end effector 308-B in the one or more second directions. FIG. 8A shows various rotational speeds for shear stimulations under different applied voltages and loads. FIG. 8B shows various torque measurements for shear stimulations under different applied voltages and loads.

Importantly, the second actuator 304-B is configured to create different classes (i.e., types or modes) of the third haptic stimulation based on an applied load and a speed at which the second end effector 308-B is rotated. For example, if the second actuator 304-B rotates the second end effector 308-B below a threshold rotational speed (e.g., below a threshold rpm) at a first applied load, a first class of the third haptic stimulation is created. However, if the second actuator 304-B rotates the second end effector 308-B at or above the threshold rotational speed at the first applied load, a second class of the third haptic stimulation is created. The first class of the third haptic stimulation is a "slip," which occurs when the second end-effector 308-B is spinning on top of the wearer's skin. In some embodiments, a rotational speed of the second end-effector 308-B in the first class is approximately 1440 RPM. The second class of the third haptic stimulation is a "stick-slip," which occurs when the second actuator 304-B periodically stalls then spins the second end-effector 308-B rapidly. The second actuator 304-B can also stall completely in some instances, which creates a third class of the third haptic stimulation. With the stick-slip and stall classes, approximately 1 Newton of force is applied (at least) to the wearer's skin. In some embodiments, the stick-slip class causes slight stretching of the user's skin, thereby creating a unique haptic cue.

FIG. 3C shows magnified views of the first actuator 304-A and the first end effector 308-A. As shown, the first actuator 304-A includes an upper lip 322 (rim, edge, and protrusion) and a lower lip 324. The upper lip 322 is configured to engage (mate) with a groove 338 of the support structure 306. The lower lip 324 is configured to engage with a groove 318 of the first end effector 308-A. The first actuator 304-A also includes a connector 326 that receives electrical signals from the processors 128 of the haptic device 120 (or the amplifiers/controllers 127 of the haptic device 120).

The first end effector 308-A includes an annulus base 315 and a plurality of arms 314-A, 314-B, 314-C extending away from the annulus base 315. In some embodiments, the first end effector 308-A is a unitary component, while in some other embodiments the plurality of arms 314 are fastened (e.g., mechanically or chemically) to the annulus base 315. Each arm 314 defines a groove 318 (notch or slot) that is configured to receive the lower lip 324 of the first actuator 304-A. It is in this way that the first actuator 304-A is coupled to the first end effector 308-A. The first end effector 308-A also includes an opening 313 (e.g., the annulus base 315 defines the opening 313) that is sized to receive and accommodate the second end effector 308-B and the optional cover 310. In other words, a diameter of the opening 313 is large enough to allow the second end effector 308-B to freely rotate therein. One skilled in the art will appreciate that the first end effector 308-A can be made from a variety of rigid materials, including plastics (e.g., PEEK, UHMWPE, HDPE, or ABS), metals (e.g., steel or aluminum), ceramics, or composite materials. The arms 314 of the first end effector 308-A are discussed in further detail below with reference to FIGS. 3D and 3E.

FIG. 3D shows a magnified view of the support structure 306. As shown, the support structure 306 includes an annulus base 330 and a sidewall 331 extending away from the annulus base 330. The support structure 306 also includes a support 333. In some embodiments, the support structure 306 is a unitary component, while in some other embodiments the sidewall 331 and support 333 are fastened (e.g., mechanically or chemically) to the annulus base 330. The sidewall 331 defines a groove 338 that is configured to receive the upper lip 322 of the first actuator 304-A. It is in this way that the first actuator 304-A is coupled to the support structure 306. The support structure 306 also includes an opening 340 (e.g., the annulus base 330 defines the opening 340) that is sized to receive and accommodate a drive shaft 344 (as shown in FIG. 3E) of the second actuator 304-B. One skilled in the art will appreciate that the support structure 306 can be made from a variety of rigid materials, including plastics (e.g., PEEK, UHMWPE, HDPE, ABS, etc.), metals (e.g., steel, aluminum, etc.), ceramics, and composite materials.

The support structure 306 also includes a chamber 336 (e.g., the sidewall 331 of the support structure 306 at least partially defines the chamber 336). The chamber 336 is an open space supported laterally by the sidewall 331 and longitudinally by the annulus base 330 and the support 333. The chamber 336 is sized to receive and accommodate the second actuator 304-B (e.g., the sidewall 331 wraps around and supports the second actuator 304-B). In this way, the second actuator 304-B is fitted inside the chamber 336 and is prevented from moving (e.g., rattling) during use of the haptic device 120 (e.g., more than half of the second actuator 308-B's circumference is supported by the sidewall 331 of the support structure 306). It is further noted, as shown in FIG. 3A, that one or more arms 314 of the first end effector 308-A define part of the chamber 336 and laterally support the second actuator 304-B when the haptic device 120 is assembled. Furthermore, the first actuator 304-A longitudinally supports the second actuator 304-B when the haptic device 120 is assembled (e.g., the first actuator 304-A "caps" the chamber 336). The annulus base 330, in some embodiments, includes fastener holes that allow the second actuator 308-B to be mechanically fastened to the support structure 306 (e.g., annulus base 330 in FIG. 3D defines three fastener holes sized to receive threaded fasteners, such as the fastener 347 in FIG. 3H).

The sidewall 331 and the support 333 of the support structure 306 also define a plurality of channels 332-A, 332-B, and 332-C. For example, a first channel 332-A is defined by the sidewall 331, a second channel 332-B is defined between and by the sidewall 331 and the support 333, and a third channel 332-C is defined between and by the sidewall 331 and the support 333. Importantly, the channels 332 are each sized to receive and accommodate one of the plurality of arms 314. Put another way, the first arm 314-A is sized to fit within the first channel 332-A, the second arm 314-B is sized to fit within the second channel 332-B, and so on. FIG. 3F shows the arms 314 positioned within the channels 332 in the assembled haptic device 120.

In addition, the support structure 306 includes a cavity 334 (e.g., portions of the sidewall 331, the support 333, and the annulus base 330 define the cavity 334). The cavity is sized to receive the annulus base 315 of the first end effector 308-A. A depth of the cavity 334 is approximately the same as a height of the annulus base 315, and as a consequence, when the first end effector 308-A is fitted together with the support structure 306, respective bottom surfaces of the first end effector 308-A and the support structure 306 align with each other (e.g., define a planar surface). In this way, the haptic device 120 lays flat on the user's skin.

FIG. 3E shows an exploded view of the representative haptic device 120 in accordance with some embodiments. As shown, the components of the haptic device 120 are coaxially aligned with an axis 342. Furthermore, several components of the haptic device 120 are designed to fit together, thereby allowing the haptic device 120 to have a compact design. To provide some additional context, dimensions of the haptic device 120 may be, in one example, 42 mm in diameter and 35 mm in height.

Also shown in FIG. 3E, the first actuator 304-A, which can be a voice coil 312 (FIG. 3H), is positioned above the second actuator 304-B, which can be a DC motor, in the haptic device 120. This arrangement prevents wire entanglement during the rotation of the DC motor. In addition, to best stimulate a single perceived point on the user's body, the end-effector 308-A of the voice coil 312 is designed around the end-effector 308-B of the DC motor. In this example, the annulus base 315 has an outer diameter of 14 mm and an inner diameter of 12 mm while the second end effector 308-B is a 5 mm slider rotating along the shaft axis 342. The voice coil 312 is configured to move the first end effector 308-A back and forth along the axis 342 while the DC motor 304-B is configured to rotate the second end effector 308-B about the axis 342. The engagement of the lower lip 324 and the groove 318 allows the voice coil 312 to move the first end effector 308-A back and forth along the axis 342.

In some embodiments, the DC motor end-effector 308-B is covered by a cover 310. The cover 310 is attached to the end-effector 308-B to maximize the shear force and also provide softer feel to the users. In some embodiments, the cover 310 is made from a silicone material.

FIG. 3F shows a bottom view of the representative haptic device 120 in accordance with some embodiments. As shown, each of the plurality of arms 314 of the first end effector 308-A is positioned within one of the plurality of channels 332. Additionally, the second end effector 308-B and the cover 310 are positioned in the opening 313 defined by the annulus base 315 (FIG. 3C).

FIG. 3G shows a side view of the representative haptic device 120 in accordance with some embodiments. As shown, the various components (e.g., end effector 308-A, end-effector 308-B, support structure 306, and the optional cover 310) that compose the bottom surface 309 of the haptic device 120 are coplanar (or substantially coplanar). In this way, the haptic device 120 is able to lay flat when attached to the user. In some instances, the end effectors are slightly offset (i.e., proud) from the support structure 306 to ensure the end effectors are preloaded and maintain contact with the user. For clarity, the sidewall 331 of the support structure 306 is labeled multiple times in FIG. 3G. As shown, the sidewall 331 includes a lower portion 331-A (which partially defines the cavity 334, along with the support 333), a middle portion 331-B, and an upper portion 331-C (which defines the groove 338). The lower portion 331-A of the sidewall may also be referred to as a "base" of the sidewall (or sidewall base) and the upper portion 331-C of the sidewall may also be referred to as a "cap" of the sidewall (or sidewall cap).

FIG. 3H shows a cross-sectional view (taken along line A-A[1] in FIG. 3F) of the representative haptic device 120 in accordance with some embodiments. As shown, the first actuator 304-A is positioned above the second actuator 304-B in the haptic device 120. The cross-sectional view also shows both groove-lip relationships. For example, the upper lip 322 is mated with the groove 338, and, as shown in the magnified view 350, the lower lip 324 is mated with the groove 318. In this arrangement, the first actuator 304-A is secured to the support structure 306 and the first end effector 308-A. The cross-sectional view also shows the components of the haptic device 120 coaxially aligned with the axis 342.

In some embodiments, the haptic device 120 includes one or more pressure sensors 351. As mentioned above with reference to FIG. 2B, the pressure sensor 351 can measure forces created by the first actuator 304-A (or the second actuator 304-B). For example, when the actuator 304-A moves the first end effector 308-A downwards along the axis, the first end effector 308-A pushes the pressure sensor 351-A against the user's body. The pressure sensor 351 may generate pressure data, which may be provided to the processors 128 of the haptic device 120 and/or to the processors of the computer system 130 (e.g., to create a feedback loop). In this way, the haptic device 120 and/or the computer system 130 can determine if an appropriate amount of force is being applied to the user. The pressure data may indicate that retuning of the actuator 304-A is needed (e.g., if the difference between the desired pressure and the actual pressure applied satisfies a retuning threshold). The pressure sensor 351 may be positioned in other locations within the haptic device 120, such as at one (or both) of the lip-groove relationships (e.g., the pressure sensor 351-B), and between the first actuator 304-A and the second actuator 304-B.

The first end effector 308-A is configured to move between two main states: (i) an unengaged state and (ii) an engaged state. The first end effector 308-A is shown in the unengaged state in FIG. 3H (e.g., the first end effector 308-A is not applying a haptic stimulation to the user of the haptic device 120). In the engaged state, the first end effector 308-A is pushed downwards by the voice coil 312, such that the first end effector 308-A and the cover 310 are no longer coplanar and, importantly, the first end effector 308-A contacts (i.e., engages, pushes against) the user's skin. An example position of the first end effector 308-A in the engaged state is shown by the dotted lines in FIG. 3H.

Figure 4A:
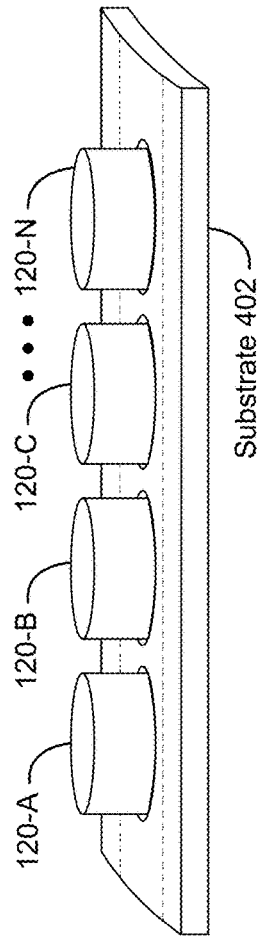
FIG. 4A illustrates a haptic device array in accordance with some embodiments.

FIG. 4A illustrates a haptic device array 400 in accordance with some embodiments. The haptic device array 400 includes a substrate 402 and a plurality of haptic devices 120-A, 120-B, 120-C, . . . 120-N integrated with the substrate 402. The haptic device array 400 can be used to create haptic stimulations across on area of the user's body. For example, if the haptic device array 400 is attached to the user's forearm, multiple portions of the user's forearm could be stimulated simultaneously or individually. In some embodiments, each haptic device 120 in the array 400 is controlled by a separate controller, whereas in other embodiments each device 120 in the array 400 is controlled by the same controller. The haptic device array 400 may be part of a wearable device, such as the wearable device 420 in FIG. 4B. In some embodiments, the haptic device array 400 can be controlled to create a stroking stimulation, where stimulations begin at one end of the array 400 and travel towards the other end of the array 400. Additionally, a speed between activation of each haptic device 120 in the array 400 can be varied to create different stroking stimulations.

Figure 4B:
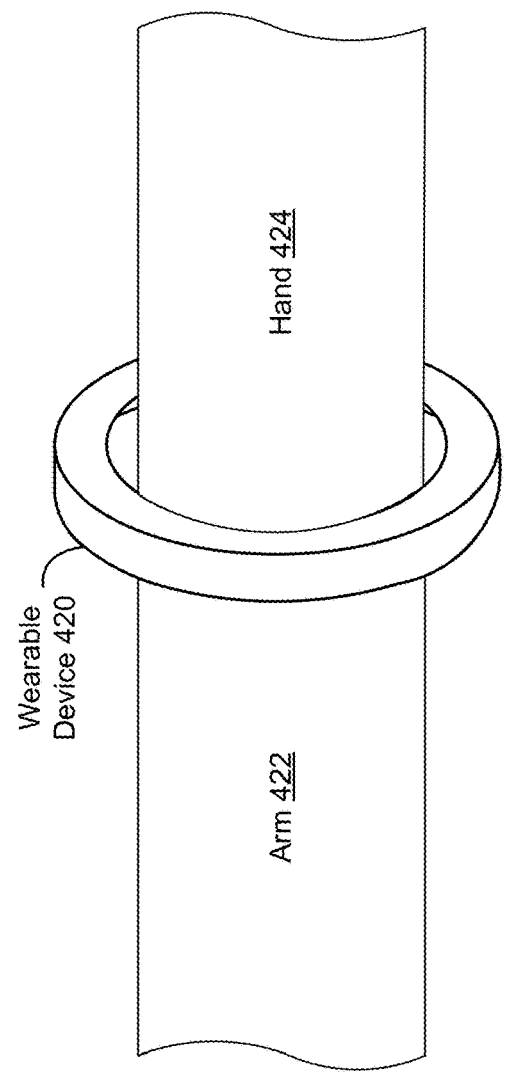
FIG. 4B illustrates a wearable device with a haptic device array attached to a user's wrist in accordance with some embodiments.

FIG. 4B illustrates a wearable device 420 attached to a user's wrist, between the user's arm 422 and the user's hand 424, in accordance with some embodiments. Although not shown, the haptic device array 400 is integrated with the wearable device 420. The wearable device 420 is designed to not restrict movement of the user's hand 424. It is noted that the wearable device 420 can also be attached to a user's ankle, or various other body parts. The components of the haptic device 120 shown in FIGS. 2A and 2B may be incorporated into the wearable device 420.

Figure 4C:
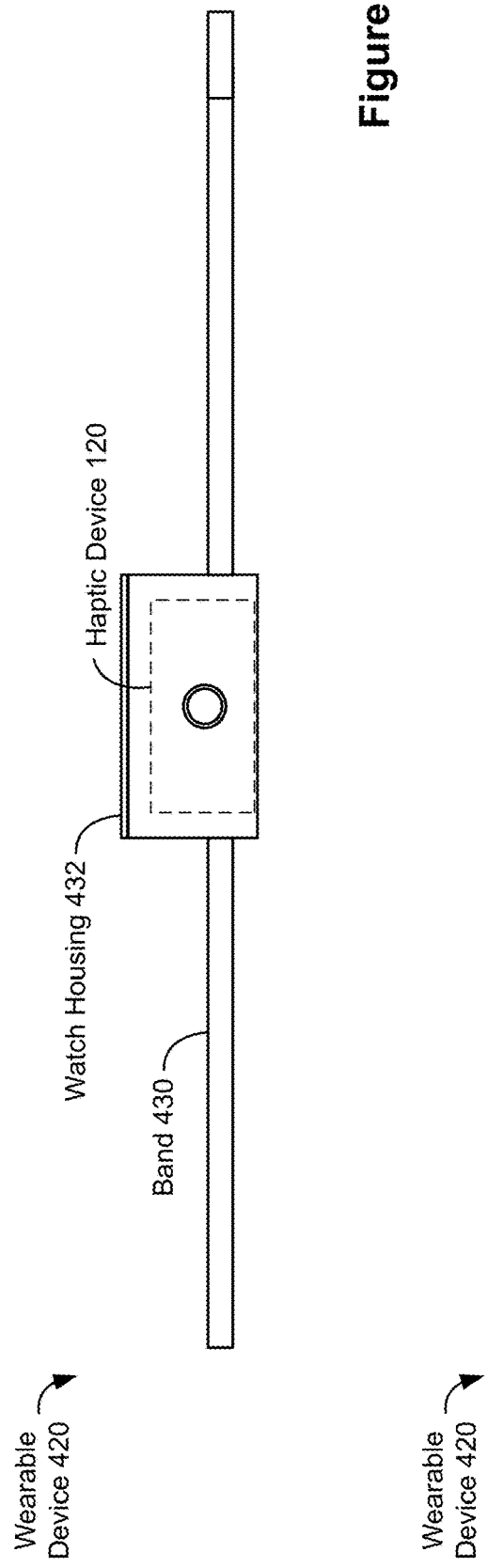
FIGS. 4C-4D illustrate haptic devices integrated with wearable devices in accordance with some embodiments
Figure 4D:
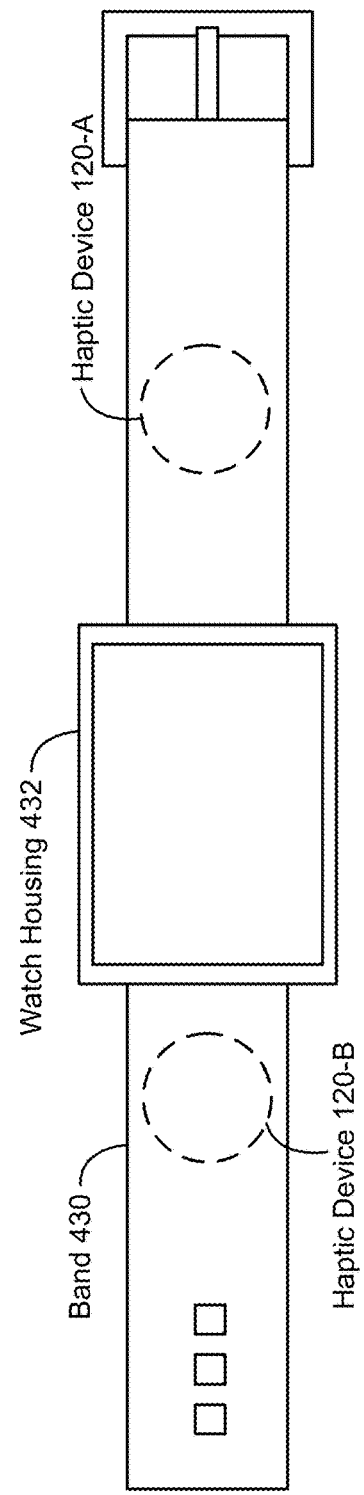

FIGS. 4C-4D illustrate haptic devices 120 integrated with wearable devices 420 in accordance with some embodiments. As shown, the example wearable device 420 in FIGS. 4C and 4D includes a band 430 and a watch housing 432. In FIG. 4C, the wearable device 420 includes at least one haptic device 120 housed within the watch housing 432. In FIG. 4D, the wearable device 420 includes a plurality of haptic devices 120-A, 120-B integrated with the band 430. It is noted that more (or fewer) haptic devices 120 may be integrated with the band 430 than the number shown in FIG. 4D. In some embodiments, the wearable device 420 includes a combination of the embodiments shown in FIGS. 4C and 4D (e.g., haptic devices 120 housed by the watch housing 432 and integrated with the band 430). Another example of haptic devices 120 integrated with a wearable device is provided in FIG. 9.

Figure 5:
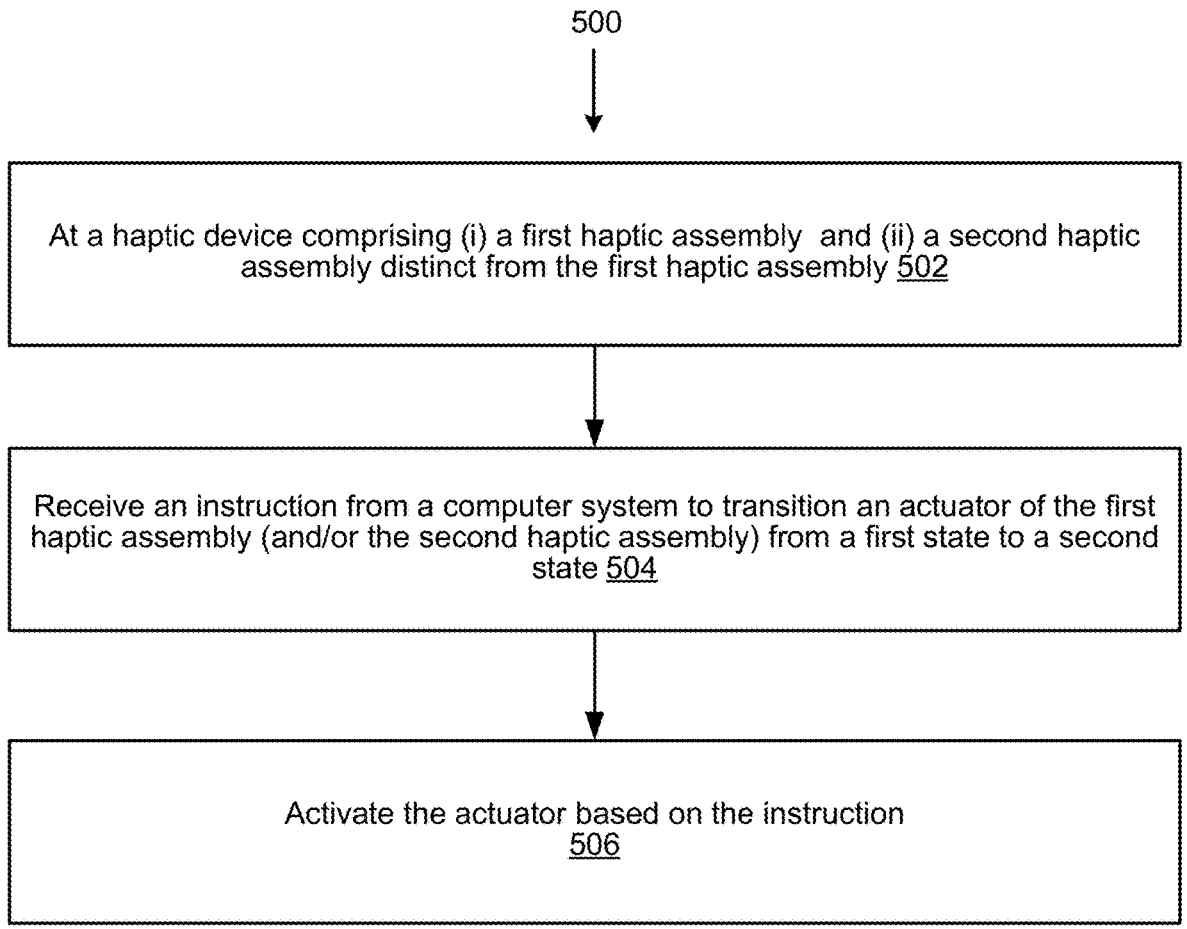
FIG. 5 shows a flowchart of a method for generating haptic stimulations in accordance with some embodiments.

FIG. 5 is a flow diagram illustrating a method 500 of generating haptic stimulations in accordance with some embodiments. The steps of the method 500 may be performed (502) by the haptic device 120. FIG. 5 corresponds to instructions stored in a computer memory or computer readable storage medium (e.g., the memory 206 of the haptic device 120).

The haptic device includes (502) a first haptic assembly (e.g., the haptic assembly 300 in FIG. 3B-1), which includes (i) a first end effector, and (ii) a first actuator coupled with the first end effector. The first actuator is configured to move the first end effector in one or more first directions. The haptic device also includes (502) a second haptic assembly (e.g., the haptic assembly 302 in FIG. 3B-2) (distinct from the first haptic assembly), which includes (i) a second end effector and (ii) a second actuator coupled with the second end effector. The second actuator is configured to move the second end effector in one or more second directions (e.g., clockwise and counterclockwise). Various embodiments of the first and second haptic assemblies are discussed above with reference to FIGS. 3A-3H.

The method 500 includes receiving (504) an instruction from a computer system 130 to transition the first actuator of the first haptic assembly from a first state to a second state, where the first actuator is configured to move the first end effector in the one or more first directions once transitioned to the second state (e.g., an active state). In other words, the first actuator is idle in the first state and is active in the second state. In some embodiments, the instruction from the computer system is generated based on media content displayed to the user via the head-mounted display 110 and/or information collected by the haptic device (e.g., via sensors included with the haptic device) and/or the head-mounted display (e.g., via sensors included with the head-mounted display).

The method 500 also includes, in response to receiving the instruction, transitioning (506) the first actuator to the second state based on the instruction. In this state, the first haptic assembly creates a first haptic stimulation or a second haptic stimulation, felt by a wearer of the haptic device, when the first actuator moves the first end effector in the one or more first directions. For example, when the first actuator is transitioned to the second state, the first end effector is pushed (and in some instances vibrated) against the wearer's body to provide a haptic stimulation (haptic cue) to the wearer. In some embodiments, the haptic stimulation corresponds to media content displayed to the user via the head-mounted display 110.

In some embodiments, a controller (e.g., one of the amplifiers/controllers 127 in FIG. 2B) is configured to control operation of the first actuator. For example, the controller sends one or more signals, generated based on the instruction from the computer system, that activate the first actuator (e.g., activation of the actuator causes the actuator to transition from the first state to the second state, and vice versa).

In some embodiments, the method 500 includes receiving another instruction from the computer system 130 to transition the second actuator of the second haptic assembly from a first state to a second state, where the second actuator is configured to move the second end effector in the one or more second directions, as mentioned above. In some embodiments, the other instruction from the computer system is generated based on media content displayed to the user via the head-mounted display 110 and/or information collected by the haptic device (e.g., via sensors included with the haptic device) and/or the head-mounted display (e.g., via sensors included with the head-mounted display).

The method 500 further includes, in response to receiving the other instruction, transitioning the second actuator of the second haptic assembly to the second state based on the other instruction. In this state, the second haptic assembly creates a third haptic stimulation, felt by the wearer of the haptic device, when the second actuator moves the second end effector in the one or more second directions. As discussed in detail above, the second haptic assembly 302 is configured to create shear stimulations, and therefore, the first, second, and third haptic stimulations are different types of haptic stimulations.

To illustrate, the second end effector may rest against the user's skin when the second actuator is idle (e.g., in the first state). However, the second end effector rotates on the user's skin when the second actuator is active (e.g., in the second state). As explained above, the user will experience different types of shear-based stimulations depending on the rotational speed of the second end effector, as well as the load applied to the second end effector. In some instances, a threshold rotational speed has to be reached in order for a second shear-based stimulation to be felt by the user. For example, with reference to FIGS. 8A and 8B, when a load of 1 Newton is applied, a first type (e.g., slip) of the shear-based stimulations is created when the rotational speed is below a threshold level and a second type (e.g., slip-stick) of the shear-based stimulations is created when the rotational speed reaches or exceeds the threshold level (e.g., in FIG. 8B, a slope of the 1 Newton line suddenly decreases when the threshold rpm is reached). In some embodiments, rotational speeds ranging from 1500 to 2000 rpm reach or exceed the threshold level. The threshold level is the point where friction between the second end effector and the user's skin reaches the stall torque on the motor, which limits the motor's ability to speed up. Thus, several factors contribute to the threshold level, including motor type, materials used, and mounting conditions.

In some embodiments, the haptic device creates the first haptic stimulation and/or the second haptic stimulation simultaneously with the third haptic stimulation. In this way, the haptic device is able to create a unique haptic cue by combining haptic stimulations. In doing so, the haptic device can convey additional information to the user (e.g., increase the information transfer). The haptic device is able to create at least seven distinct haptic stimulations: vibration, pressure, shear, vibration+pressure, vibration+shear, pressure+shear, and vibration+pressure+shear. Additional haptic stimulations can be created by varying parameters of the general haptic types (e.g., slip shear versus slip-stick shear or higher frequency vibration versus low frequency vibration).

In some embodiments, the instruction instructs the haptic device to create the first haptic stimulation, the second haptic stimulation, or both. In this way, the haptic device is able to create a unique haptic cue by combining the first and second haptic stimulations, or create unique haptic cues by separating the first and second haptic stimulations. In doing so, the haptic device can convey information to the user in three different forms, as discussed above.

Embodiments of this disclosure may include or be implemented in conjunction with various types of artificial reality systems. Artificial reality may constitute a form of reality that has been altered by virtual objects for presentation to a user. Such artificial reality may include and/or represent VR, AR, MR, hybrid reality, or some combination and/or variation of one or more of the these. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used to, for example, create content in an artificial reality and/or are otherwise used in (e.g., to perform activities in) an artificial reality.

Artificial reality systems may be implemented in a variety of different form factors and configurations. Some artificial reality systems are designed to work without near-eye displays (NEDs), an example of which is AR system 900 in FIG. 9. Other artificial reality systems may include an NED, which provides visibility into the real world (e.g., the AR system 1000 in FIG. 10) or that visually immerses a user in an artificial reality (e.g., the VR system 1100 in FIG. 11). While some artificial reality devices are self-contained systems, other artificial reality devices communicate and/or coordinate with external devices to provide an artificial reality experience to a user. Examples of such external devices include handheld controllers, mobile devices, desktop computers, devices worn by a user (e.g., a wearable device 420), devices worn by one or more other users, and/or any other suitable external system.

Figure 9:
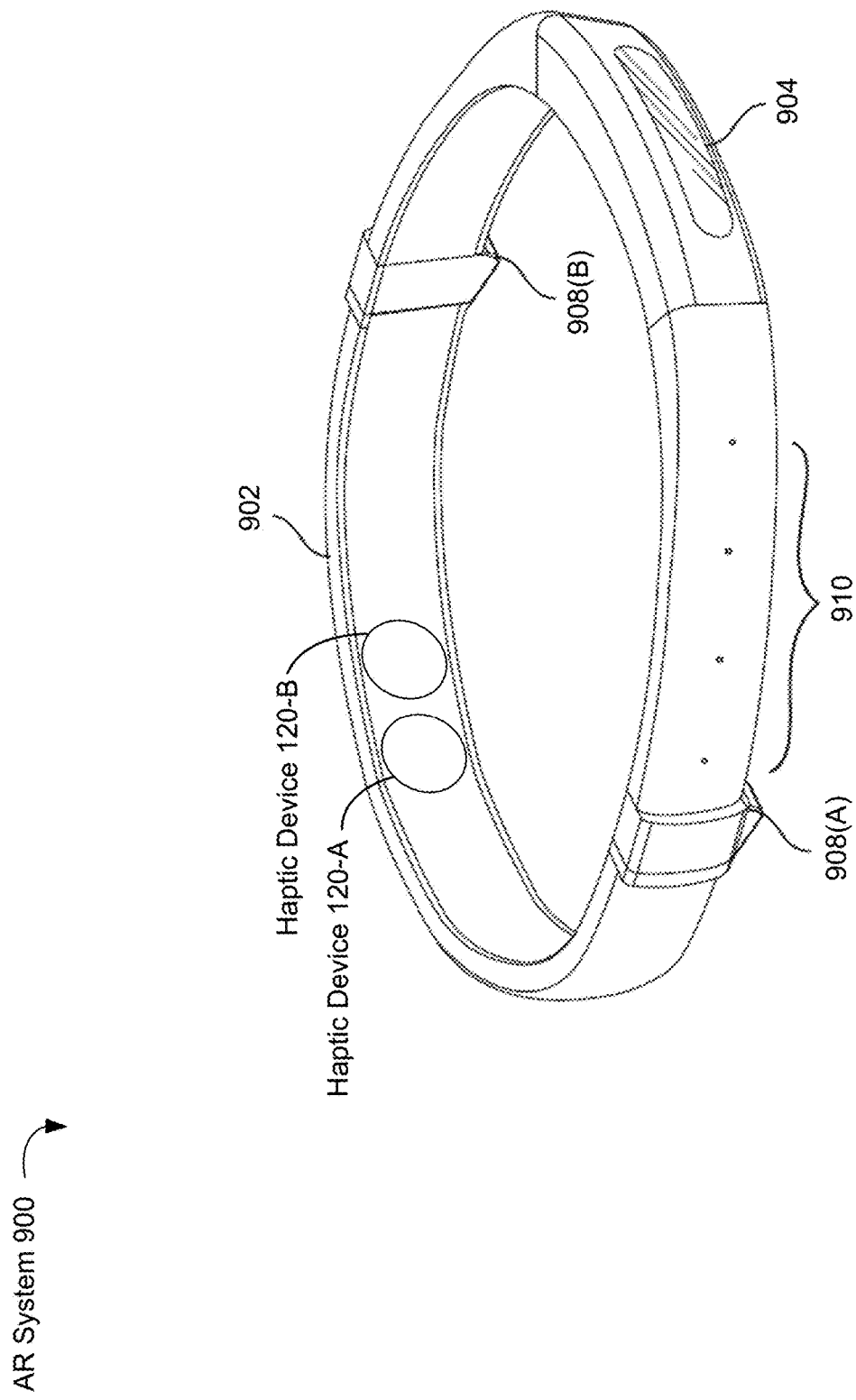
FIG. 9 illustrates an embodiment of an artificial reality device.
Figure 10:
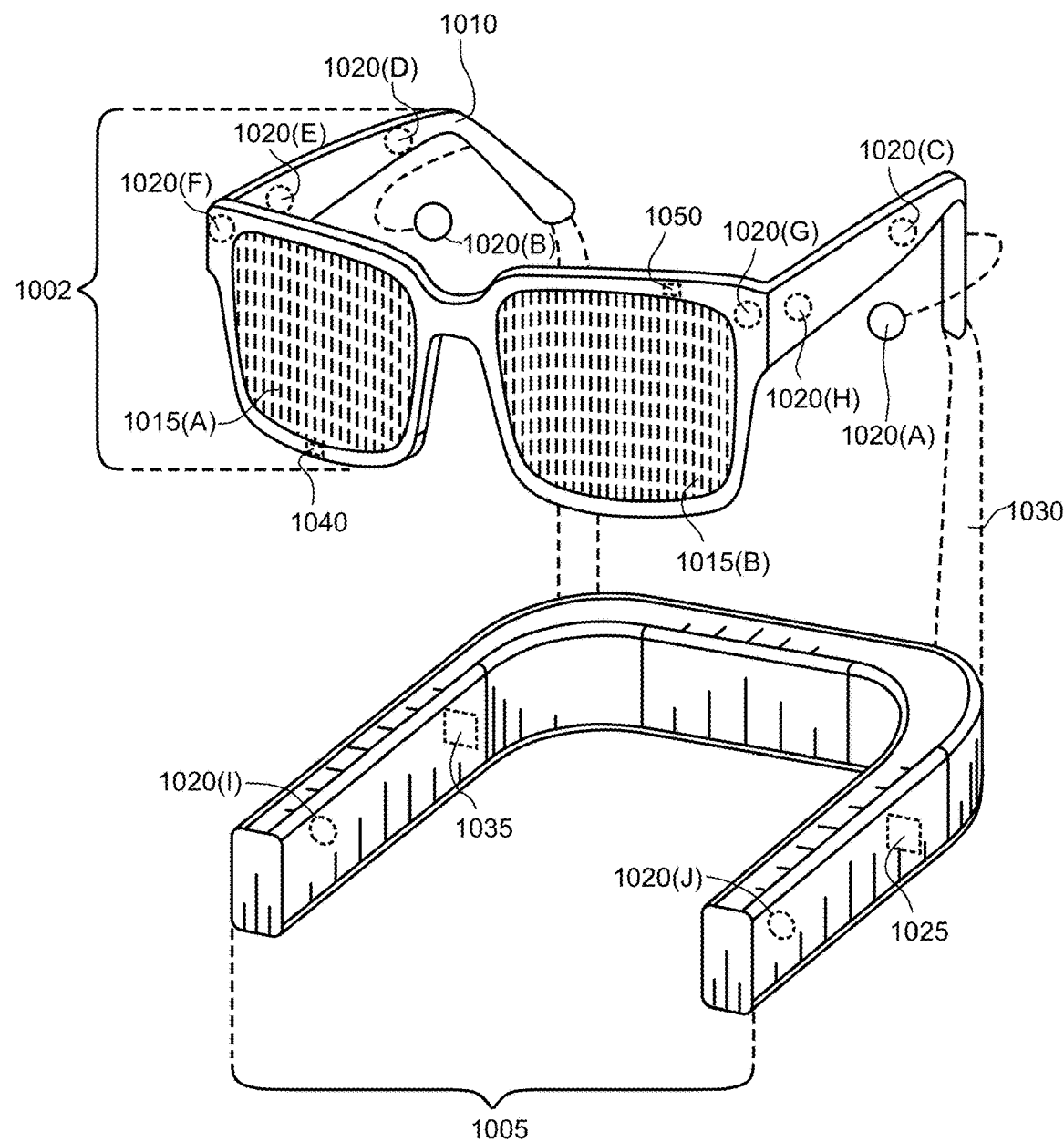
FIG. 10 illustrates an embodiment of an augmented reality headset and a corresponding neckband.
Figure 11:
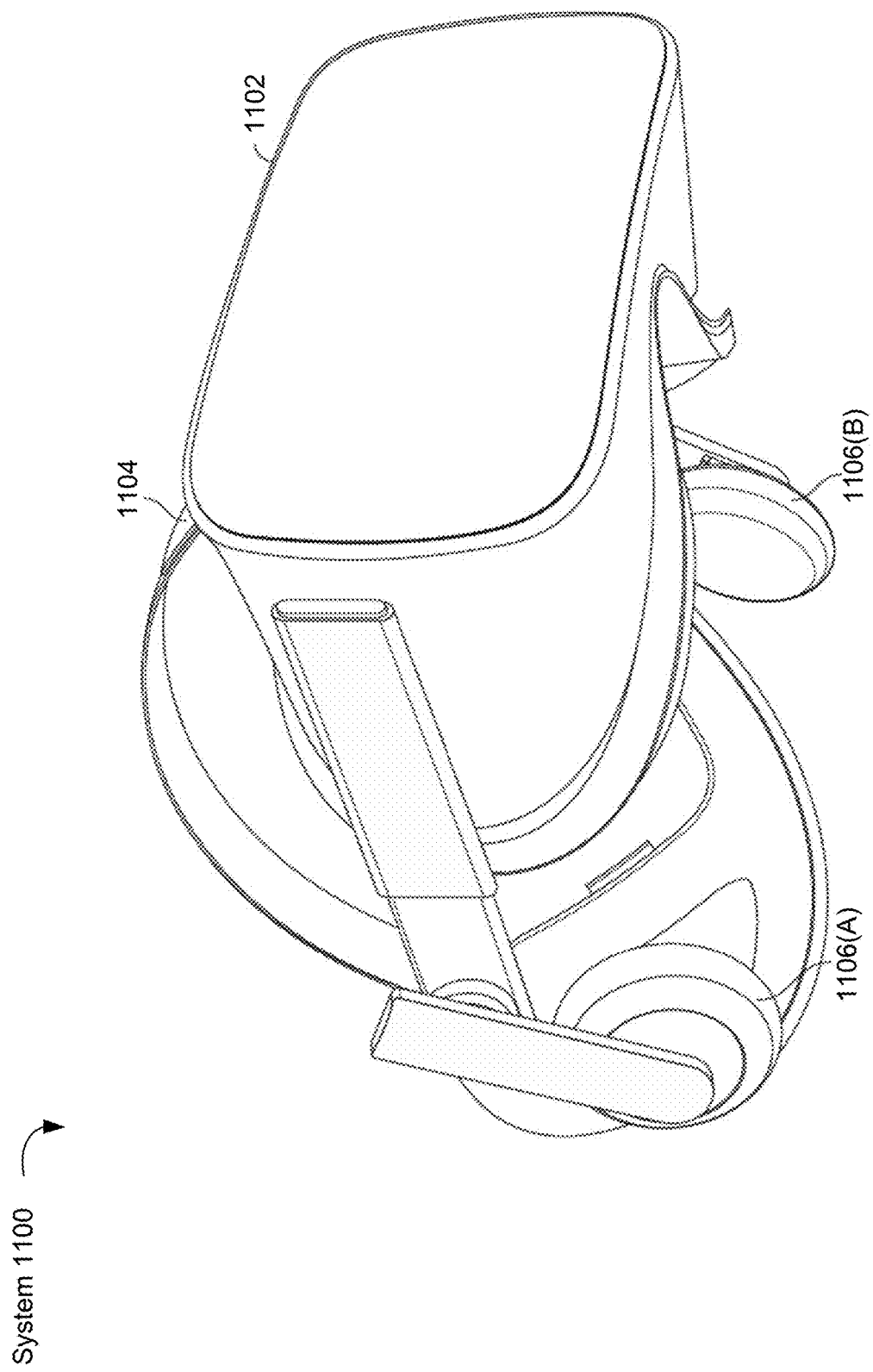
FIG. 11 illustrates an embodiment of a virtual reality headset.

FIGS. 9-11 provide additional examples of the devices used in the system 100. The AR system 900 in FIG. 9 generally represents a wearable device dimensioned to fit about a body part (e.g., a head) of a user. The AR system 900 may include the functionality of the wearable device 420, and may include additional functions not described above. As shown, the AR system 900 includes a frame 902 (e.g., band) and a camera assembly 904, which is coupled to the frame 902 and configured to gather information about a local environment by observing the local environment. The AR system 900 may also include one or more transducers. In one example, the AR system 900 includes output transducers 908(A) and 908(B) and input transducers 910. Output transducers 908(A) and 908(B) may provide audio feedback, haptic feedback, and/or content to a user, and input audio transducers may capture audio (or other signals/waves) in a user's environment.

In some embodiments, the AR system 900 include one or more instances of the haptic device 120 disclosed herein (e.g., the haptic devices 120-A and 120-B). In this way, the AR system 900 is able to create haptic stimulations, as discussed in detail above.

Thus, the AR system 900 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 900 may not include an NED, the AR system 900 may include other types of screens or visual feedback devices (e.g., a display screen integrated into a side of frame 902).

The embodiments discussed in this disclosure may also be implemented in AR systems that include one or more NEDs. For example, as shown in FIG. 10, the AR system 1000 may include an eyewear device 1002 with a frame 1010 configured to hold a left display device 1015(A) and a right display device 1015(B) in front of a user's eyes. The display devices 1015(A) and 1015(B) may act together or independently to present an image or series of images to a user. While the AR system 1000 includes two displays, embodiments of this disclosure may be implemented in AR systems with a single NED or more than two NEDs.

In some embodiments, the AR system 1000 may include one or more sensors, such as the sensor 1040. The sensor 1040 may generate measurement signals in response to motion of the AR system 1000 and may be located on substantially any portion of frame 1010. The sensor 1040 may include a position sensor, an inertial measurement unit (IMU), a depth camera assembly, or any combination thereof. The AR system 1000 may or may not include a sensor 1040 or may include more than one sensor. In embodiments in which the sensor 1040 includes an IMU, the IMU may generate calibration data based on measurement signals from the sensor 1040. Examples of the sensor 1040 include, without limitation, accelerometers, gyroscopes, magnetometers, other suitable types of sensors that detect motion, sensors used for error correction of the IMU, or some combination thereof. Sensors are also discussed above with reference to FIG. 1.

The AR system 1000 may also include a microphone array with a plurality of acoustic sensors 1020(A)-1020(J), referred to collectively as the acoustic sensors 1020. The acoustic sensors 1020 may be transducers that detect air pressure variations induced by sound waves. Each acoustic sensor 1020 may be configured to detect sound and convert the detected sound into an electronic format (e.g., an analog or digital format). The microphone array in FIG. 10 may include, for example, ten acoustic sensors: 1020(A) and 1020(B), which may be designed to be placed inside a corresponding ear of the user, acoustic sensors 1020(C), 1020(D), 1020(E), 1020(F), 1020(G), and 1020(H), which may be positioned at various locations on the frame 1010, and/or acoustic sensors 1020(I) and 1020(J), which may be positioned on a corresponding neckband 1005. In some embodiments, the neckband 1005 is an example of the computer system 130.

The configuration of acoustic sensors 1020 of the microphone array may vary. While the AR system 1000 is shown in FIG. 10 as having ten acoustic sensors 1020, the number of acoustic sensors 1020 may be greater or less than ten. In some embodiments, using more acoustic sensors 1020 may increase the amount of audio information collected and/or the sensitivity and accuracy of the audio information. In contrast, using a lower number of acoustic sensors 1020 may decrease the computing power required by a controller 1025 to process the collected audio information. In addition, the position of each acoustic sensor 1020 of the microphone array may vary. For example, the position of an acoustic sensor 1020 may include a defined position on the user, a defined coordinate on the frame 1010, an orientation associated with each acoustic sensor, or some combination thereof.

The acoustic sensors 1020(A) and 1020(B) may be positioned on different parts of the user's ear, such as behind the pinna or within the auricle or fossa. Or, there may be additional acoustic sensors on or surrounding the ear in addition to acoustic sensors 1020 inside the ear canal. Having an acoustic sensor positioned next to an ear canal of a user may enable the microphone array to collect information on how sounds arrive at the ear canal. By positioning at least two of the acoustic sensors 1020 on either side of a user's head (e.g., as binaural microphones), the AR device 1000 may simulate binaural hearing and capture a 3D stereo sound field around about a user's head. In some embodiments, the acoustic sensors 1020(A) and 1020(B) may be connected to the AR system 1000 via a wired connection, and in other embodiments, the acoustic sensors 1020(A) and 1020(B) may be connected to the AR system 1000 via a wireless connection (e.g., a Bluetooth connection). In still other embodiments, acoustic sensors 1020(A) and 1020(B) may not be used at all in conjunction with the AR system 1000.

The acoustic sensors 1020 on the frame 1010 may be positioned along the length of the temples, across the bridge, above or below the display devices 1015(A) and 1015(B), or some combination thereof. The acoustic sensors 1020 may be oriented such that the microphone array is able to detect sounds in a wide range of directions surrounding the user wearing AR system 1000. In some embodiments, an optimization process may be performed during manufacturing of AR system 1000 to determine relative positioning of each acoustic sensor 1020 in the microphone array.

The AR system 1000 may further include or be connected to an external device (e.g., a paired device), such as neckband 1005. As shown, the neckband 1005 may be coupled to the eyewear device 1002 via one or more connectors 1030. The connectors 1030 may be wired or wireless connectors and may include electrical and/or non-electrical (e.g., structural) components. In some cases, the eyewear device 1002 and the neckband 1005 may operate independently without any wired or wireless connection between them. While FIG. 10 illustrates the components of the eyewear device 1002 and the neckband 1005 in example locations on the eyewear device 1002 and the neckband 1005, the components may be located elsewhere and/or distributed differently on the eyewear device 1002 and/or the neckband 1005. In some embodiments, the components of the eyewear device 1002 and the neckband 1005 may be located on one or more additional peripheral devices paired with the eyewear device 1002, the neckband 1005, or some combination thereof. Furthermore, the neckband 1005 generally represents any type or form of paired device. Thus, the following discussion of neckband 1005 may also apply to various other paired devices, such as smart watches, smart phones, wrist bands, other wearable devices, hand-held controllers, tablet computers, or laptop computers.

Pairing external devices, such as a neckband 1005, with AR eyewear devices may enable the eyewear devices to achieve the form factor of a pair of glasses while still providing sufficient battery and computation power for expanded capabilities. Some or all of the battery power, computational resources, and/or additional features of the AR system 1000 may be provided by a paired device or shared between a paired device and an eyewear device, thus reducing the weight, heat profile, and form factor of the eyewear device overall while still retaining desired functionality. For example, the neckband 1005 may allow components that would otherwise be included on an eyewear device to be included in the neckband 1005 because users may tolerate a heavier weight load on their shoulders than they would tolerate on their heads. The neckband 1005 may also have a larger surface area over which to diffuse and disperse heat to the ambient environment. Thus, the neckband 1005 may allow for greater battery and computation capacity than might otherwise have been possible on a standalone eyewear device. Because weight carried in the neckband 1005 may be less invasive to a user than weight carried in the eyewear device 1002, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

The neckband 1005 may be communicatively coupled with the eyewear device 1002 and/or to other devices. The other devices may provide certain functions (e.g., tracking, localizing, depth mapping, processing, storage, etc.) to the AR system 1000. In the embodiment of FIG. 10, the neckband 1005 may include two acoustic sensors 1020(I) and 1020(J), which are part of the microphone array (or potentially form their own microphone subarray). The neckband 1005 may also include a controller 1025 and a power source 1035.

The acoustic sensors 1020(I) and 1020(J) of the neckband 1005 may be configured to detect sound and convert the detected sound into an electronic format (analog or digital). In the embodiment of FIG. 10, the acoustic sensors 1020(I) and 1020(J) may be positioned on the neckband 1005, thereby increasing the distance between neckband acoustic sensors 1020(I) and 1020(J) and the other acoustic sensors 1020 positioned on the eyewear device 1002. In some cases, increasing the distance between the acoustic sensors 1020 of the microphone array may improve the accuracy of beamforming performed via the microphone array. For example, if a sound is detected by the acoustic sensors 1020(C) and 1020(D) and the distance between acoustic sensors 1020(C) and 1020(D) is greater than, for example, the distance between the acoustic sensors 1020(D) and 1020(E), the determined source location of the detected sound may be more accurate than if the sound had been detected by the acoustic sensors 1020(D) and 1020(E).

The controller 1025 of the neckband 1005 may process information generated by the sensors on the neckband 1005 and/or the AR system 1000. For example, the controller 1025 may process information from the microphone array, which describes sounds detected by the microphone array. For each detected sound, the controller 1025 may perform a direction of arrival (DOA) estimation to estimate a direction from which the detected sound arrived at the microphone array. As the microphone array detects sounds, the controller 1025 may populate an audio data set with the information. In embodiments in which the AR system 1000 includes an IMU, the controller 1025 may compute all inertial and spatial calculations from the IMU located on the eyewear device 1002. The connector 1030 may convey information between the AR system 1000 and the neckband 1005 and between the AR system 1000 and the controller 1025. The information may be in the form of optical data, electrical data, wireless data, or any other transmittable data form. Moving the processing of information generated by the AR system 1000 to the neckband 1005 may reduce weight and heat in the eyewear device 1002, making it more comfortable to a user.

The power source 1035 in the neckband 1005 may provide power to the eyewear device 1002 and/or to the neckband 1005. The power source 1035 may include, without limitation, lithium-ion batteries, lithium-polymer batteries, primary lithium batteries, alkaline batteries, or any other form of power storage. In some cases, the power source 1035 may be a wired power source. Including the power source 1035 on the neckband 1005 instead of on the eyewear device 1002 may help better distribute the weight and heat generated by the power source 1035.

As noted, some artificial reality systems may, instead of blending an artificial reality with actual reality, substantially replace one or more of a user's sensory perceptions of the real world with a virtual experience. One example of this type of system is a head-worn display system, such as the VR system 1100 in FIG. 11, which mostly or completely covers a user's field of view. the VR system 1100 may include a front rigid body 1102 and a band 1104 shaped to fit around a user's head. the VR system 1100 may also include output audio transducers 1106(A) and 1106(B). Furthermore, while not shown in FIG. 11, front rigid body 1102 may include one or more electronic elements, including one or more electronic displays, one or more IMUs, one or more tracking emitters or detectors, and/or any other suitable device or system for creating an artificial reality experience. Although not shown, the VR system 1100 may include the computer system 130.

Artificial reality systems may include a variety of types of visual feedback mechanisms. For example, display devices in the AR system 1000 and/or the VR system 1100 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems also include optical subsystems having one or more lenses (e.g., conventional concave or convex lenses, Fresnel lenses, or adjustable liquid lenses) through which a user may view a display screen.

In addition to or instead of using display screens, some artificial reality systems include one or more projection systems. For example, display devices in the AR system 1000 and/or the VR system 1100 may include micro-LED projectors that project light (e.g., using a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, the AR system 900, the AR system 1000, and/or the VR system 1100 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 9 and 11, the output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 910 may include condenser microphones, dynamic microphones, ribbon microphones, and/or any other type or form of input transducer. In some embodiments, a single transducer may be used for both audio input and audio output.

The artificial reality systems shown in FIGS. 9-11 may include tactile (i.e., haptic) feedback systems, which may be incorporated into headwear, gloves, body suits, handheld controllers, environmental devices (e.g., chairs or floormats), and/or any other type of device or system, such as the wearable devices 420 discussed herein. Additionally, in some embodiments, the haptic feedback systems may be incorporated with the artificial reality systems (e.g., the AR system 900 may include the haptic device 120 shown in FIG. 1. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independently of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, or business enterprises), entertainment purposes (e.g., for playing video games, listening to music, or watching video content), and/or for accessibility purposes (e.g., as hearing aids or vision aids). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios, including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as the systems 900, 1000, and 1100) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a Direction of Arrival ("DOA") analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy, including ear canal length and the positioning of the ear drum. The artificial reality device may provide an alignment and orientation guide, which the user may follow to customize the sound signal presented to the user based on a personal HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (e.g., using any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A haptic device comprising:
a support structure supporting a first haptic assembly and a second haptic assembly, wherein:
the first haptic assembly, comprises:
a first end effector; and
a first actuator coupled with the first end effector, the first actuator being configured to move the first end effector in one or more first directions along an axis, wherein the first haptic assembly is configured to create a first haptic stimulation or a second haptic stimulation, felt by a wearer of the haptic device, when the first actuator moves the first end effector in the one or more first directions;
the second haptic assembly, comprises:
a second end effector; and
a second actuator, different from and positioned proximate to the first actuator within the support structure along the axis, coupled with the second end effector, the second actuator being configured to rotate the second end effector in one or more second directions about the axis, wherein the second haptic assembly is configured to create a third haptic stimulation, felt by the wearer of the haptic device, when the second actuator rotates the second end effector in the one or more second directions about the axis; and the first haptic stimulation is a vibration stimulation, the second haptic stimulation is a pressure stimulation, and third haptic stimulation is a shear stimulation.

2. The haptic device of claim 1, wherein the second actuator is positioned closer to the wearer's skin, relative to the first actuator, when the haptic device is attached to the wearer.

3. The haptic device of claim 1, wherein the first end effector and the second end effector are adjacent to the wearer's skin when the haptic device is attached to the wearer.

4. The haptic device of claim 1, wherein:
the haptic device has opposing first and second ends; and
the first end effector is an elongated annulus that extends from the first actuator to the second end of the haptic device.

5. The haptic device of claim 1, wherein:
the first actuator is positioned along a first axis;
the one or more first directions are opposing directions defined along the first axis; and
the first end effector is configured to move back and forth in the one or more first directions along the first axis.

6. The haptic device of claim 5, wherein:
the one or more second directions are opposing rotational directions around the first axis; and
the second end effector is configured to rotate about the first axis.

7. The haptic device of claim 6, wherein the first and second actuators are coaxially aligned along the first axis.

8. The haptic device of claim 1, wherein the support structure encloses, at least partially, the first and second haptic assemblies, and the support structure is configured to anchor the first and second haptic assemblies to the wearer.

9. The haptic device of claim 1, wherein the second end effector includes an end cover made from silicone.

10. The haptic device of claim 1, wherein the first haptic assembly is further configured to create the first haptic stimulation and the second haptic stimulation simultaneously.

11. The haptic device of claim 1, wherein the first and second haptic assemblies are further configured to create the first haptic stimulation and/or the second haptic stimulation simultaneously with the third haptic stimulation.

12. The haptic device of claim 11, wherein the first and second haptic assemblies are able to convey approximately 2 bits of information to the wearer of the haptic device by creating the first haptic stimulation and/or the second haptic stimulation simultaneously with the third haptic stimulation.

13. The haptic device of claim 1, further comprising one or more processors in communication with a remote computing device,
wherein the one or more processors are configured to receive an instruction from the remote computing device and control operation of the first and second actuators based on the instruction.

14. The haptic device of claim 13, wherein:
a first processor of the one or more processors is configured to control operation of the first actuator; and
a second processor, distinct from the first processor, of the one or more processors is configured to control operation of the second actuator.

15. The haptic device of claim 1, wherein:
the first actuator is a voice coil; and
the second actuator is a direct current (DC) motor.

16. A wearable device comprising:
an array of haptic devices, each haptic device comprising:
a support structure supporting a first haptic assembly and a second haptic assembly, wherein:
the first haptic assembly, comprises:
a first end effector; and
a first actuator coupled with the first end effector, the first actuator being configured to move the first end effector in one or more first directions along an axis, wherein the first haptic assembly is configured to create a first haptic stimulation or a second haptic stimulation, felt by a wearer of the haptic device, when the first actuator moves the first end effector in the one or more first directions;
the second haptic assembly, comprises:
a second end effector; and
a second actuator, different from and positioned proximate to the first actuator within the support structure along the axis, coupled with the second end effector, the second actuator being configured to rotate the second end effector in one or more second directions about the axis, wherein the second haptic assembly is configured to create a third haptic stimulation, felt by the wearer of the haptic device, when the second actuator rotates the second end effector in the one or more second directions along the axis; and
the first haptic stimulation is a vibration stimulation, the second haptic stimulation is a pressure stimulation, and the third haptic stimulation is a shear stimulation.

17. A method comprising:
at a haptic device comprising (i) a first haptic assembly including a first end effector and a first actuator coupled with the first end effector, (ii) a second haptic assembly distinct from the first haptic assembly, the second haptic assembly including a second end effector and a second actuator different from and positioned proximate to the first actuator, and (iii) a support structure supporting the first haptic assembly and the second haptic assembly:
receiving a first instruction from a computer system to transition a first actuator of the first haptic assembly from a first state to a second state, wherein the first actuator is configured to move a first end effector in one or more first directions along an axis once transitioned to the second state;
in response to receiving the first instruction:
transitioning the first actuator to the second state based on the instruction, wherein the first haptic assembly creates a first haptic stimulation or a second haptic stimulation, felt by a wearer of the haptic device, when the first actuator moves the first end effector in the one or more first directions along the axis;
receiving a second instruction from the computer system to transition a second actuator of the second haptic assembly from a first state to a second state, wherein the second actuator is configured to move the second end effector in one or more second directions; and
in response to receiving the second instruction:
transitioning the second actuator of the second haptic assembly to the second state, wherein the second haptic assembly creates a third haptic stimulation, felt by the wearer of the haptic device, when the second actuator moves the second end effector in the one or more second directions.

* * * * *